(12) United States Patent
Suzuki

(10) Patent No.: US 11,618,350 B2
(45) Date of Patent: Apr. 4, 2023

(54) LIFTER DEVICE

(71) Applicant: TOYOTA BOSHOKU KABUSHIKI KAISHA, Aichi-ken (JP)

(72) Inventor: Yasuaki Suzuki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 219 days.

(21) Appl. No.: 16/950,503

(22) Filed: Nov. 17, 2020

(65) Prior Publication Data
US 2021/0146805 A1    May 20, 2021

(30) Foreign Application Priority Data

Nov. 20, 2019    (JP) .............................. JP2019-209419

(51) Int. Cl.
*B60N 2/16*       (2006.01)
*F16H 19/04*      (2006.01)
*F16D 41/16*      (2006.01)

(52) U.S. Cl.
CPC ............. *B60N 2/167* (2013.01); *B60N 2/168* (2013.01); *B60N 2/1685* (2013.01); *F16D 41/16* (2013.01); *F16H 19/04* (2013.01)

(58) Field of Classification Search
CPC ...... B60N 2/1635; B60N 2/165; B60N 2/167; B60N 2/168; B60N 2/1685; B60N 2/1615; F16D 41/12; F16D 41/16; F16D 67/02; F16H 31/005; F16H 9/04
See application file for complete search history.

(56) References Cited

U.S. PATENT DOCUMENTS

| 8,109,373 | B2 * | 2/2012 | Paing ..................... | B60N 2/168 |
| | | | | 192/15 |
| 2020/0171984 | A1 | 6/2020 | Kajino et al. | |
| 2021/0129713 | A1 * | 5/2021 | Kajino .................. | B60N 2/165 |

FOREIGN PATENT DOCUMENTS

| JP | 2016-132423 A | 7/2016 | |
| JP | 2019-189127 A | 10/2019 | |
| JP | 2019-189133 A | 10/2019 | |
| WO | WO-2019208745 A1 * | 10/2019 | ........... B60N 2/1615 |

OTHER PUBLICATIONS

German Office Action in counterpart German Application No. DE102020130408.0, dated May 17, 2021 (and English translation thereof).

* cited by examiner

*Primary Examiner* — Richard M Lorence
(74) *Attorney, Agent, or Firm* — Greenblum & Bernstein, P.L.C.

(57) ABSTRACT

A lifter device includes a pinion gear and a rotation control device that is configured to control rotation of the pinion gear. The rotation control device includes a rotation shaft, a support member, a rotation driving mechanism, and a lock mechanism. The rotation drive mechanism includes a feed gear, and a plurality of feed pawls. The lock mechanism is configured to release locking of the rotation shaft until any one of the feed pawls meshes with the feed gear when an operation handle is operated. A plurality of the feed pawls are provided with respect to either operation direction on a seat lifting side or lowering side of the operation handle, and one of the feed pawls meshes with the feed gear when at least one of the others of the feed pawls does not mesh with the gear.

9 Claims, 28 Drawing Sheets

LIFTER DEVICE

CROSS REFERENCE TO RELATED APPLICATIONS

This application is based on Japanese Patent Applications No. 2019-209419 filed on Nov. 20, 2019, the entire contents of which are incorporated herein by reference.

TECHNICAL FIELD

The present disclosure relates to a lifter device used in a seat of an automobile or the like.

BACKGROUND ART

A lifter device used in a seat of an automobile or the like adjusts a height of a seat cushion with respect to a floor upon operation on an operation handle, and various types of lifter devices have been developed. The invention of JP-A-2019-189127 adjusts the height by an amount corresponding to the operation amount for each operation on the operation handle when the operation handle is operated toward a seat lifting side or lowering side, and is configured to perform a so-called pumping operation of repeating the operation on the operation handle until reaching the height desired by a seated person.

Specifically, a rotation control device is configured to rotate a pinion gear coupled to a link mechanism for lifting or lowering the seat, in response to the operation on the operation handle toward the seat lifting side or lowering side. In the rotation control device, a rotation drive mechanism for rotationally driving the pinion gear and a lock mechanism for locking the rotation of the pinion gear are provided on a rotation shaft of the pinion gear.

When the operation handle is operated toward the seat lifting side or lowering side, the pinion gear is driven by the rotation driving mechanism to rotate so as to lift or lower the seat. On the other hand, the lock mechanism releases the locking upon receiving an operation force from the operation handle, and locks the rotation of the pinion gear at a position where the lock mechanism stops receiving the operation force from the operation handle.

Therefore, in a case of lifting or lowering the seat, when the operation handle is operated, the lock mechanism is first released from lock to enable the rotation of the pinion gear, and then the pinion gear is driven to rotate. In order to operate the rotation drive mechanism and the lock mechanism in this manner, an operation force transmission delay mechanism for delaying the operation of the rotation drive mechanism with respect to the operation of the lock mechanism at the start of the operation on the operation handle is provided. According to the invention of JP-A-2019-189127, a rotation transmission plate that is rotated upon the operation on the operation handle is configured to release the locking of the lock mechanism, and then drive the pinion gear to rotate. That is, in this case, the rotation transmission plate constitutes the operation force transmission delay mechanism.

In the invention of JP-A-2019-189127, feed pawls mesh with internal teeth of the rotation transmission plate upon the operation on the operation handle, so as to drive the rotation transmission plate to rotate. Here, the feed pawls are normally in a state of meshing with the internal teeth of the rotation transmission plate even in a neutral position where the operation handle is not operated.

On the other hand, it is also possible to adopt a configuration in which the feed pawls are separated from and do not mesh with the internal teeth of the rotation transmission plate (hereinafter, referred to as a feed gear) in the neutral position where the operation handle is not operated, and the feed pawls mesh with the feed gear at the start of the operation on the operation handle, between which the lock mechanism is released from lock (not publicly known). In this case, the configuration of meshing and separating the feed pawls with respect to the feed gear corresponds to the operation force transmission delay mechanism, and it is possible to eliminate the need to provide another member as the operation force transmission delay mechanism.

As described above, when the operation force transmission delay mechanism is configured such that the feed pawls are separated from and do not mesh with the feed gear in the neutral position where the operation handle is not operated, when the feed pawls complete a feed operation and is separated from the feed gear, the feed pawls need to return to a predetermined position away from the feed gear in preparation for the next operation. On the other hand, since the position of the feed gear is determined by the operation amount of the operation handle, phases of teeth may be shifted between the feed pawls and the feed gear, which are located apart from each other, depending on the operation amount of the operation handle. If the phases are shifted between the feed pawls and the feed gear which are separated from each other, when the operation handle is operated for the next time and the feed pawls are to mesh with the feed gear, the feed pawls cannot transmit the operation force of the operation handle to the feed gear until both have matching phases and mesh with each other. Therefore, until the operating force of the operation handle is transmitted to the feed gear, an operation loss is generated for one gear tooth of the feed gear at maximum.

An object of the present disclosure is to, in a lifter device that transmits an operating force of an operation handle to a feed gear by feed pawls so as to drive a pinion gear of a seat lifting/lowering mechanism to rotate, which moves the feed pawls so as to mesh with the feed gear at the start of the operation on the operation handle and which releases lock of the pinion gear during the movement, provide a plurality of combinations of the feed pawls and the feed gear having different meshing phases, and cause the feed gear to feed with a combination that meshes first among the plurality of combinations. Thus, operation loss before the operation force of the operation handle is transmitted to the feed gear is prevented.

SUMMARY (1) According to an aspect of the present disclosure, a lifter device includes:

a pinion gear that is configured to mesh with an input gear of a link mechanism that lifts or lowers a seat; and a rotation control device that is configured to control rotation of the pinion gear and includes:

a rotation shaft that is configured to rotate in synchronization with the pinion gear, a support member that rotatably supports the rotation shaft, a rotation driving mechanism that is configured to, when an operation handle for lifting or lowering the seat is operated to lift or lower the seat, rotate the rotation shaft toward a lifting side or a lowering side in accordance with an operation direction of the operation handle, and a lock mechanism that is configured to, when the operation handle is operated to lift or lower the seat, allow rotation of the rotation shaft, and to lock the rotation of the rotation shaft in a neutral position in which the operation handle is released from operation, wherein the rotation drive mechanism includes:

a feed gear that is coupled with and configured to rotate together with the rotation shaft, whose circumference is provided with a gear, and a plurality of feed pawls that is configured to mesh with the feed gear so as to drive the feed gear to rotate in the operation direction of the operation handle when the operation handle is operated, and to be released from meshing with the feed gear so as to be returned to a predetermined position when the operation handle is released from operation and is returned to the neutral position, wherein the lock mechanism is configured to release locking of the rotation shaft until any one of the feed pawls meshes with the feed gear when the operation handle is operated, and wherein a plurality of the feed pawls are provided with respect to either operation direction on the seat lifting side or lowering side of the operation handle, and one of the feed pawls meshes with the feed gear when at least one of the others of the feed pawls does not mesh with the gear.

In the first aspect of the disclosure, the rotation drive mechanism may rotate the rotation shaft toward the lowering side either by using a gravity of the seat or by the operation force of the operation handle. In the former case of the rotation drive mechanism, only feed pawls for rotating the rotation shaft toward the lifting side are provided. Further, the feed gear may be either an internal gear or an external gear. The number of feed pawls may be any number of two or more with respect to said either operation direction. Further, a configuration for generating a phase difference between the feed pawls include changing circumferential positions of the feed pawls on the circumference of the feed gear, setting the number of teeth of the feed gear to a number of teeth that is not divisible by the number of feed pawls, changing circumferential positions of engagement ends of the feed pawls on the circumference of the feed gear, and the like.

According to the first aspect of the disclosure, when the operation handle is operated to lift or lower the seat, one of the plurality of feed pawls that meshes with the feed gear earliest drives the feed gear to rotate, so as to rotate the pinion gear. Therefore, even when a rotational position of the feed gear varies or changes depending on a difference in a stroke amount of a previous feed operation by the operation handle, the feed gear is driven to rotate by the feed pawl that meshes earliest, whereby the operation loss from the operation on the operation handle to the rotation of the pinion gear can be reduced.

Moreover, at the start of the operation on the operation handle, the feed pawls do not mesh with the feed gear, and the lock mechanism is released from lock until any one of the feed pawls is engaged with the feed gear. Therefore, it is not necessary to separately provide another member in order to constitute the operation force transmission delay mechanism for delaying the rotational drive of the feed gear by the feed pawls until the lock is released, which simplifies the configuration of the device.

(2) In the lifter device according to the above configuration (1), the feed pawls include:

a plurality of lifting-side feed pawls configured to rotate the rotation shaft toward the lifting side, in which one of the lifting-side feed pawls meshes with the gear when at least one of the others of the lifting-side feed pawls does not mesh with the gear, and a plurality of lowering-side feed pawls configured to rotate the rotation shaft toward the lower side, in which one of the lowering-side feed pawls meshes with the gear when at least one of the others of the lowering-side feed pawls does not meshes with the gear.

According to the second aspect of the disclosure, a plurality of feed pawls having meshing phases different from each other are provided on each of the lifting side and the lowering side. Therefore, the above-described operation loss reducing effect can be provided on both the lifting side and the lowering side.

(3) In the lifter device according to the above configuration (1) or (2), the number of the feed pawls with respect to said either operation direction of the operation handle is an even number, and the number of teeth of the gear on the entire circumference of the feed gear is an odd number.

According to the third aspect of the disclosure, since the number of the feed pawls is an odd number while the number of teeth of the feed gear is an even number, even when the feed pawls are arranged to face each other on the circumference of the feed gear, the meshing phases of the feed pawls can be made different from each other. Therefore, it is not necessary to change the shape of the feed pawls in order to make the meshing phases of the plurality of feed pawls different from each other, and the plurality of feed pawls can be used in common. In addition, even when the plurality of feed pawls are used in common, it is not necessary to adjust the positions of the plurality of feed pawls in a manner shifted from positions facing each other on the circumference of the feed gear so that the meshing phases between the plurality of feed pawls are different from each other.

(4) In the lifter device according to the above configuration (3), the feed pawls include:

a pair of lifting-side feed pawls configured to rotate the rotation shaft toward the lifting side in which one of the pair of the lifting-side feed pawls meshes with the gear when the other of the pair of the lifting-side feed pawls does not mesh with the gear, and a pair of lowering-side feed pawls configured to rotate the rotation shaft toward the lower side in which one of the pair of the lowering-side feed pawls meshes with the gear when the other of the pair of the lowering-side feed pawls does not mesh with the gear, each of the lifting-side feed pawls and the lowering-side feed pawls is rotatably supported by a hinge pin on a rotation plate that is rotated upon operation on the operation handle, and is spring urged so as to rotate in a direction in which the feed pawl meshes with the feed gear, the hinge pins of the lifting-side feed pawls and the hinge pins of the lowering-side feed pawls are respectively supported so as to face each other across a rotation axis of the rotation plate, the gear of the feed gear is constituted by internal teeth, and the rotation plate is on an inner side of the internal teeth of the feed gear and is configured such that the lifting-side feed pawls and the lowering-side feed pawls mesh with the internal teeth, and the support member is provided with a plurality of release pieces configured to abut against the lifting-side feed pawls and the lowering-side feed pawls so as to rotate the feed pawls to positions at which the feed pawls does not mesh with the feed gear when the operation handle is released from the operation and is in the neutral position, and to allow the feed pawls to mesh with the feed gear when the operation handle is operated to lift or lower the seat.

In the fourth aspect of the present disclosure, the hinge pins that rotatably support the feed pawls with respect to the rotation plate may be provided on either the rotation plate or the feed pawls.

According to the fourth aspect of the disclosure, since the plurality of feed pawls supported by the rotation plate are arranged on the inner peripheral side of the feed gear provided with the internal teeth, the feed gear and the feed pawl can be configured compactly as a single package. Further, a pair of feed pawls are provided in each feed direction, and the number of teeth of the feed gear is set to an odd number. Thus, the meshing phases of the feed pawls in the same feed direction can be shifted from each other in a state in which the feed pawls are arranged to face each other on a virtual straight line passing through the rotation center of the rotation plate. As a result, the feed pawls can be used in common. Further, when regulation of meshing by release pieces of the feed pawls to the feed gear is released, the feed pawls mesh with the feed gear due to spring urging. Therefore, it is possible to realize a state in which one of the plurality of feed pawls mesh first and the other feed pawls do not mesh by a difference in deflection of the springs.

(5) In the lifter device according to the above configuration (4), the lock mechanism includes:

a lock plate coupled in a rotational direction to the rotation shaft, an operation plate configured to be rotated by the operation handle, and a pawl configured to be operated by the operation plate to lock or unlock rotation of the lock plate, and the operation plate is coupled so as to be rotated simultaneously with the rotation plate by the operation handle.

According to the fifth aspect of the disclosure, the operation plate for operating the lock mechanism is rotated in response to the operation on the operation handle simultaneously with the rotation plate for moving the feed pawls toward the internal teeth of the feed gear. Therefore, the lock mechanism can be released from lock before the feed pawls mesh with the feed gear.

(6) The lifter device according to any one of the above configurations (2), (4) and (5) further includes a friction generation unit that is configured to apply a frictional force to the rotation of the rotation shaft when the operation handle is operated to lower the seat.

According to the sixth aspect of the disclosure, since a frictional force is applied to the rotation shaft at the start of the operation on the operation handle toward the seat lowering side, the lock mechanism is released from lock and the seat can be prevented from being abruptly lowered until the feed pawls mesh with the feed gear.

(7) According to another aspect of the present disclosure, a lifter device includes:

a pinion gear that is configured to mesh with an input gear of a link mechanism that lifts or lowers a seat; and a rotation control device that is configured to control rotation of the pinion gear and includes:

a rotation shaft that is configured to rotate in synchronization with the pinion gear, a support member that rotatably supports the rotation shaft, a rotation driving mechanism that is configured to, when an operation handle for lifting or lowering the seat is operated to lift or lower the seat, rotate the rotation shaft toward a lifting side or a lowering side in accordance with an operation direction of the operation handle, and a lock mechanism that is configured to, when the operation handle is operated to lift or lower the seat, allow rotation of the rotation shaft, and to lock the rotation of the rotation shaft in a neutral position in which the operation handle is released from operation, wherein the rotation drive mechanism includes:

a feed gear that is coupled with and configured to rotate together with the rotation shaft, whose circumference is provided with a gear, and a plurality of feed pawls that is configured to mesh with the feed gear so as to drive the feed gear to rotate in the operation direction of the operation handle when the operation handle is operated, and to be released from meshing with the feed gear so as to be returned to a predetermined position when the operation handle is released from operation and is returned to the neutral position, and wherein the lock mechanism is configured to release locking of the rotation shaft until any one of the feed pawls meshes with the feed gear when the operation handle is operated.

In the seventh aspect of the disclosure, the rotation drive mechanism may employ rotate the rotation shaft toward the lowering side either by using the gravity of the seat or by the operation force of the operation handle. In the former case of the rotation drive mechanism, only feed pawls for rotating the rotation shaft toward the lifting side are provided. Further, the feed gear may be either an internal gear or an external gear. The number of feed pawls may be either one or two with respect to said either operation direction.

According to the seventh aspect, at the start of the operation on the operation handle, the feed pawls do not mesh with the feed gear, and the lock mechanism is released from lock until any one of the feed pawls is engaged with the feed gear. Therefore, it is not necessary to separately provide another member in order to constitute the operation force transmission delay mechanism for delaying the rotational drive of the feed gear by the feed pawls until the lock is released, which simplifies the configuration of the device.

DESCRIPTION OF EMBODIMENTS

<One Embodiment>

Figure 1:
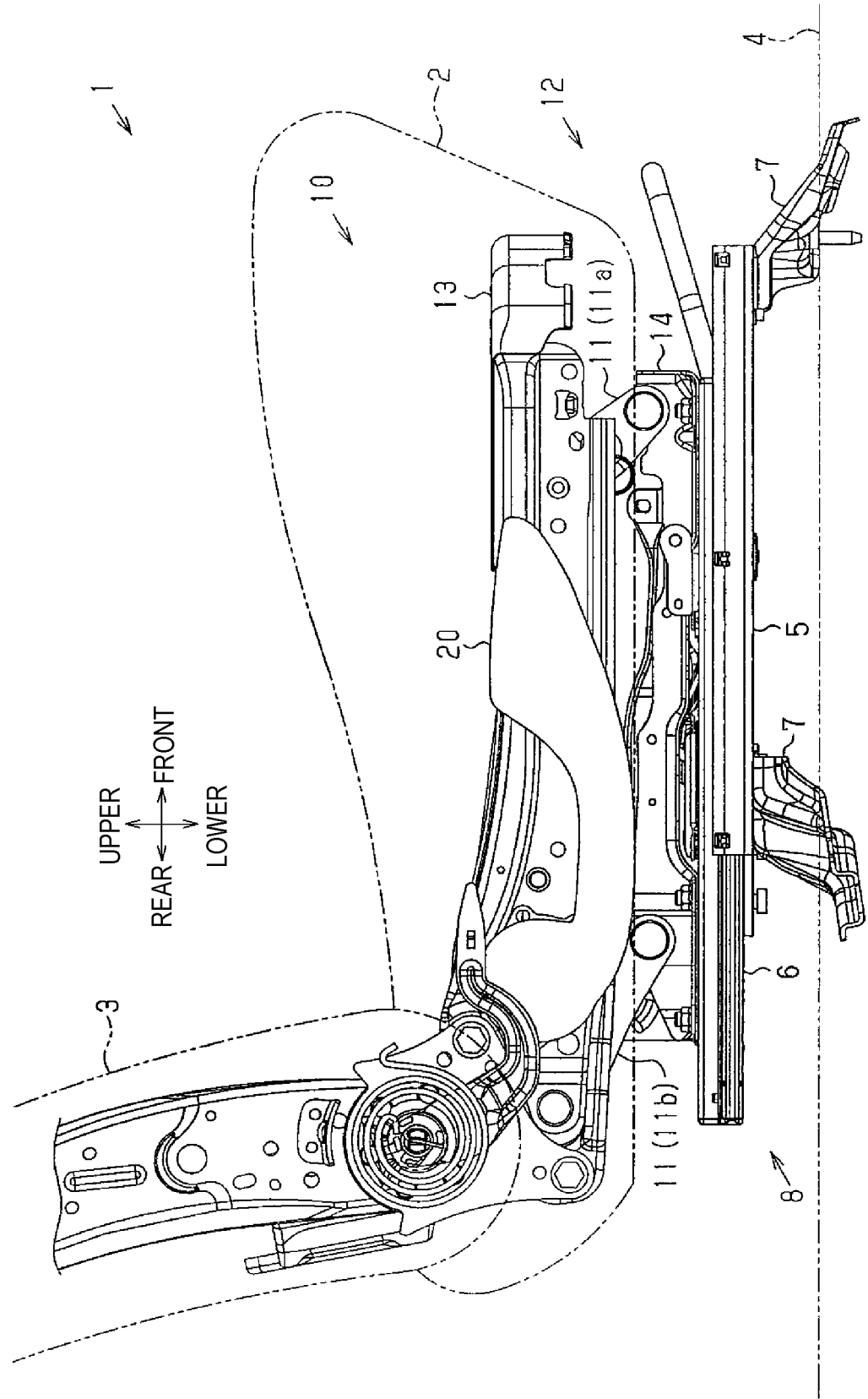
FIG. 1 is a side view showing a schematic configuration of a lifter device according to an embodiment of the present disclosure.
Figure 2:
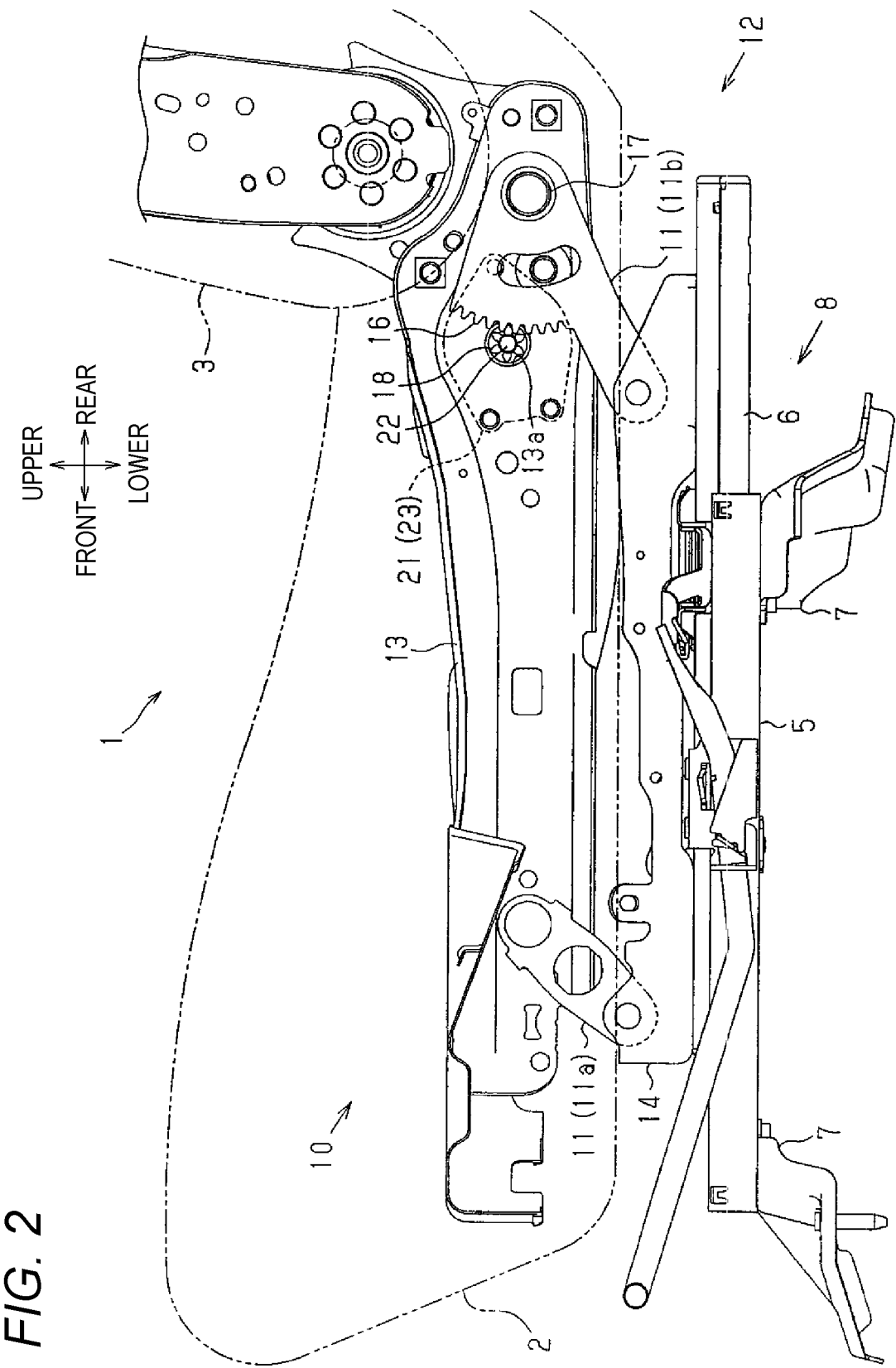
FIG. 2 is a side view of a structure on the same side as viewed from a seat inner side.
Figure 3:
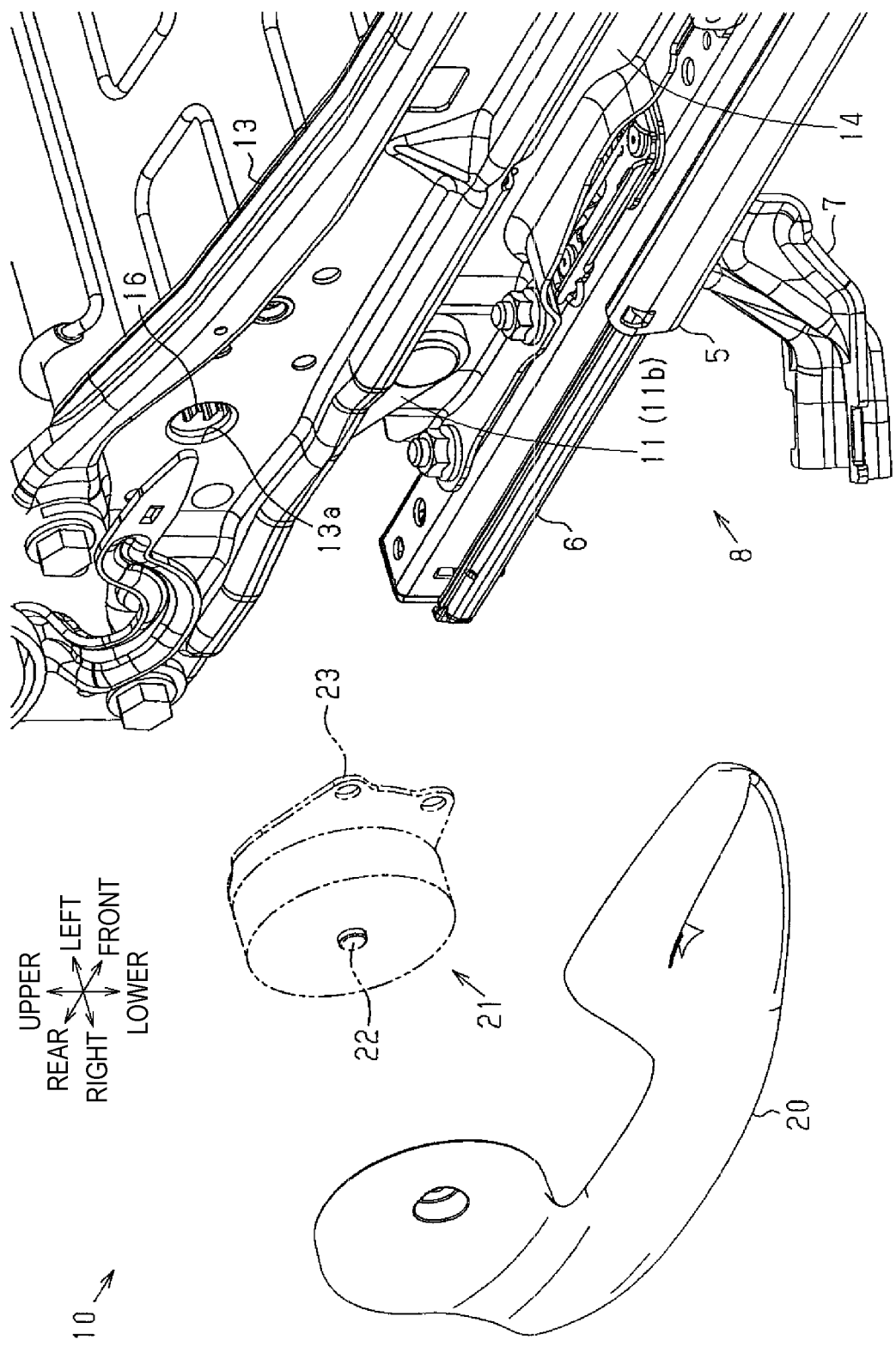
FIG. 3 is an exploded perspective view showing a state in which an operation handle and a rotation control device are detached from a seat frame.

FIGS. 1 to 3 show an automobile seat 1 (hereinafter simply referred to as a seat) to which a lifter device 10 according to an embodiment of the present disclosure is applied. In the drawings, directions of portions in a state where the seat 1 is mounted to an automobile are indicated by arrows. In the following description, descriptions on directions are made with reference to these directions. The same applies to the drawings other than FIGS. 1 to 3.

<Schematic Configuration of Lifter Device 10>

As illustrated in FIG. 1, the seat 1 includes a seat back 3 serving as a backrest on a rear side of a seat cushion 2 serving as a sitting portion. The seat back 3 is rotatable in a front-rear direction relative to the seat cushion 2. The seat cushion 2 includes the lifter device 10 and a seat slide device 8 at a lower portion thereof, and is fixed to a vehicle floor 4 via a bracket 7.

As illustrated in FIG. 2, the seat slide device 8 is a known device in the related art and includes a pair of left and right upper rails 6 and a pair of left and right lower rails 5 coupled with each other to be slidable back and forth. The pair of left and right upper rails 6 and the pair of left and right lower rails 5 extend in the front-rear direction. The left and right lower rails 5 are fixedly supported by a pair of front and rear brackets 7 fixed to the floor 4. The lifter device 10 is provided above the left and right upper rails 6.

As illustrated in FIGS. 2 and 3, the lifter device 10 includes a base member 14 fixed on each of the upper rails 6 and a plurality of link members 11 rotatably coupled to front and rear portions of the base member 14. The base member 14 and the link members 11, together with a side frame 13 serving as a framework member of the seat cushion 2, constitute a link mechanism 12 that is a four-bar linkage. Among the plurality of link members 11, a rear link 11b on a right rear side includes a sector gear 16 (corresponding to "input gear" of the present disclosure) and is rotated in the front-rear direction via a pinion gear 18 of a rotation control device 21. A rotation shaft of the rear link 11b on the right rear side relative to the side frame 13 is formed by a torque rod 17. A rear link (not illustrated) on a left rear side is also rotated in synchronization with the rear link 11b via the torque rod 17.

The side frame 13 has a through hole 13a for inserting the pinion gear 18. The rotation control device 21 is fixed to a right wall of the side frame 13 by inserting the pinion gear 18 into the through hole 13a. The rotation control device 21 is rotatable in forward and reverse directions via an operation handle 20 that is provided on a right side of the seat cushion 2 and extends in the front-rear direction. When the operation handle 20 is rotated upward from a neutral position, the rotation control device 21 is rotated in a direction in which the rear link 11b is erected from the base member 14. When the operation handle 20 is rotated downward from the neutral position, the rotation control device 21 is rotated in a direction in which the rear link 11b is turned down on the base member 14. With the configuration of the above four-bar linkage, a front link 11a is also rotated in response to the rotation of the rear link 11b, so that a height position of the seat cushion 2 relative to the floor 4 is adjusted in response to the operation on the operation handle 20.

<Schematic Configuration of Rotation Control Device 21>

Figure 4:
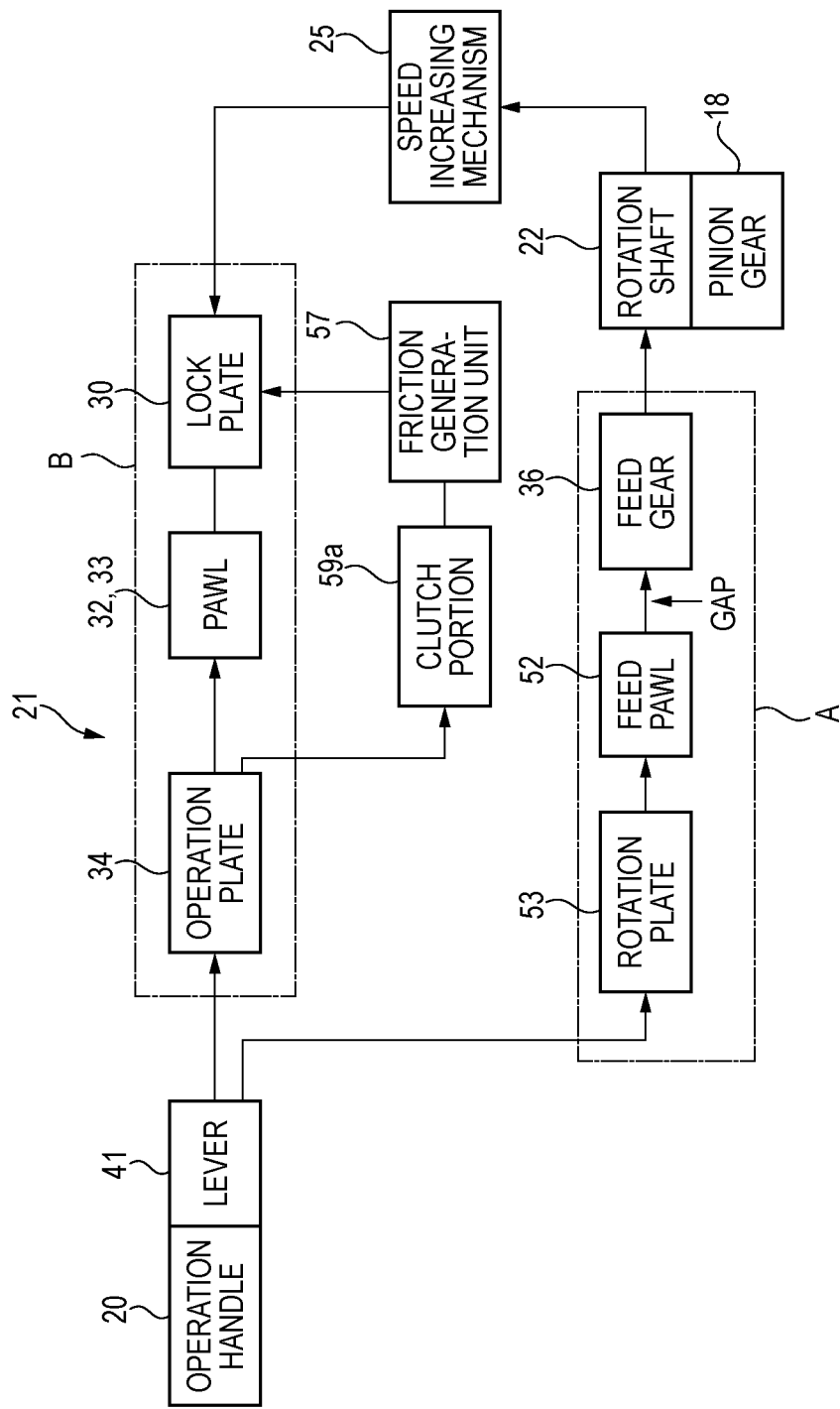
FIG. 4 is a functional block diagram showing a schematic configuration of the rotation control device.
Figure 5:
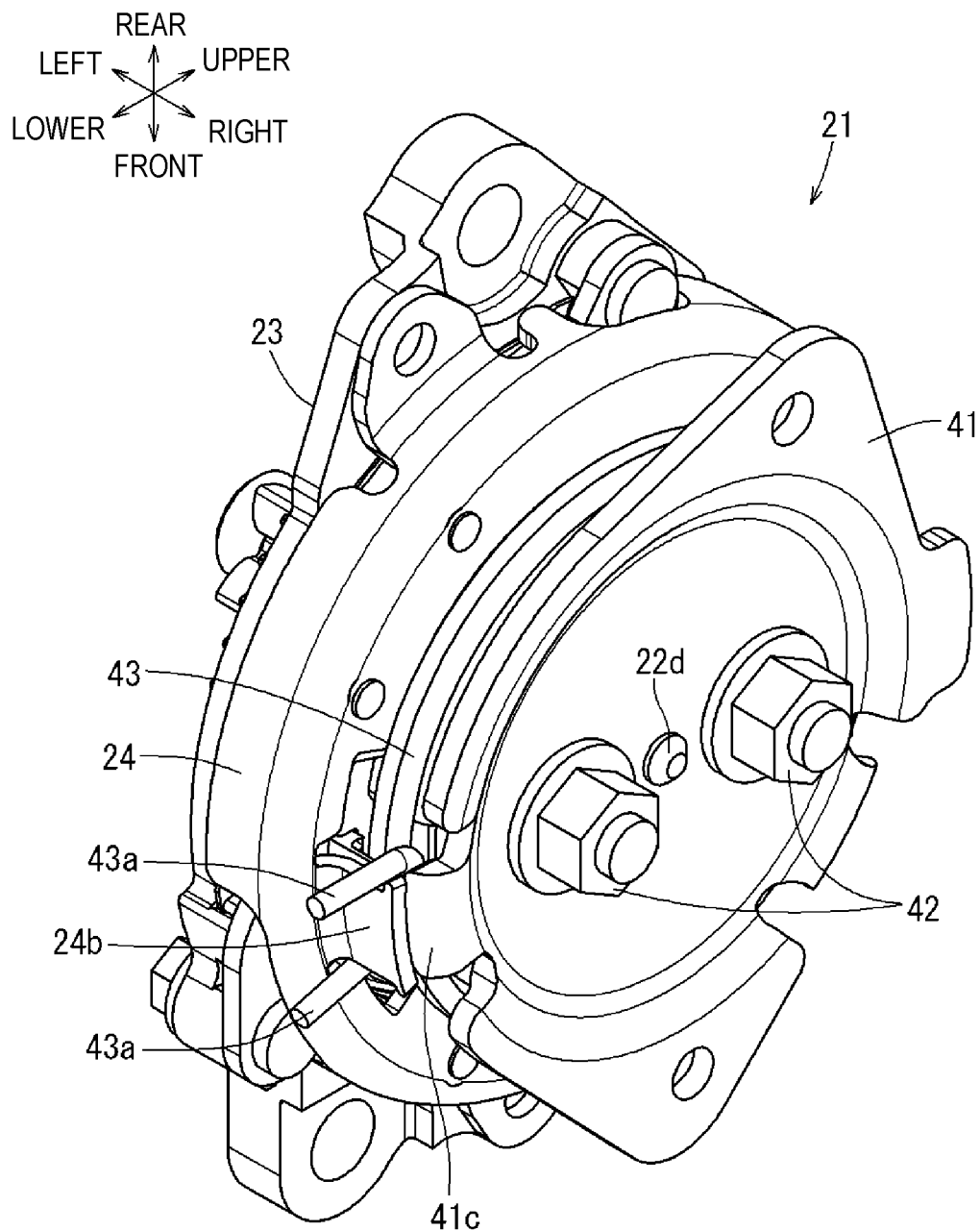
FIG. 5 is a perspective view of the rotation control device as viewed from a seat outer side.
Figure 6:
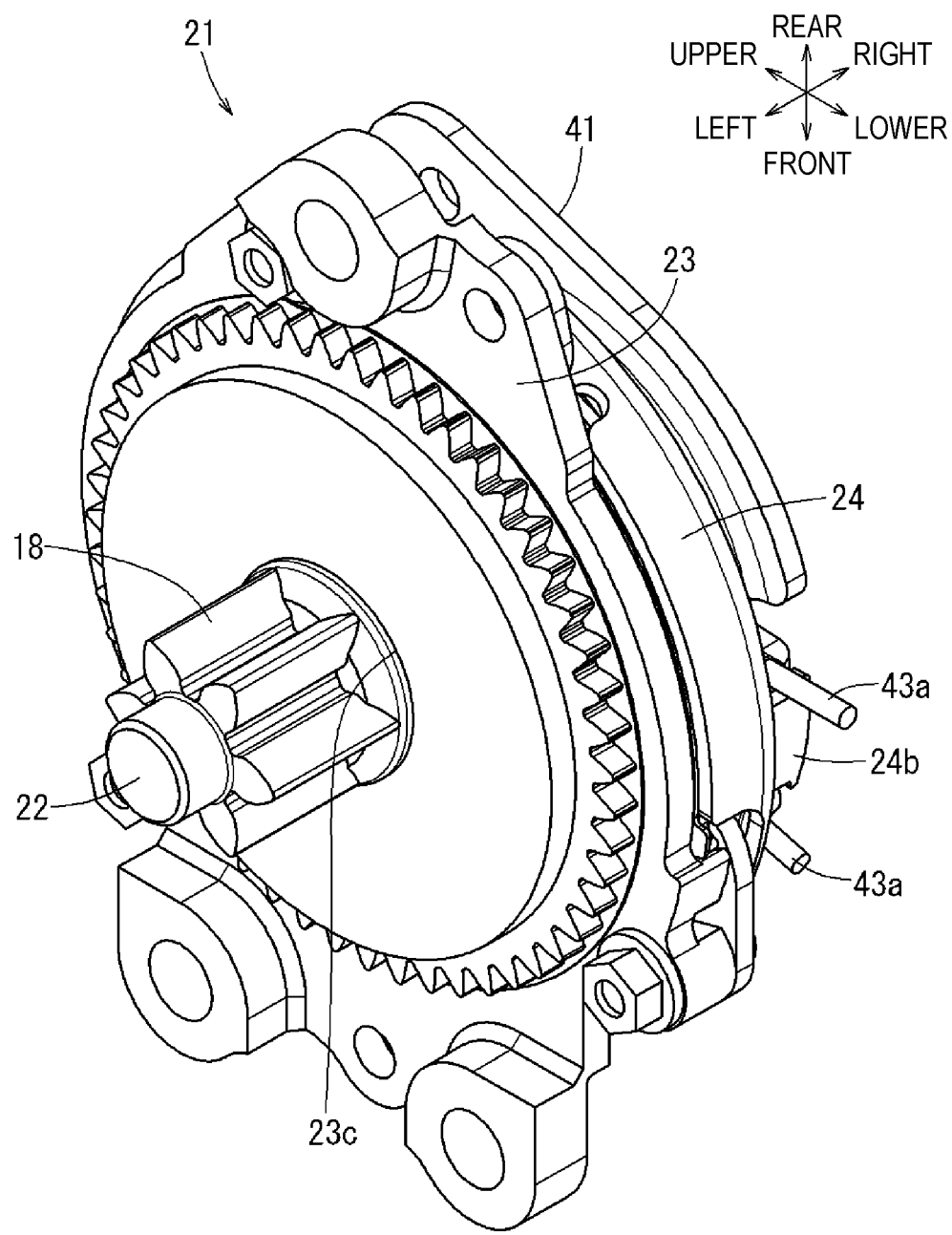
FIG. 6 is a perspective view of the rotation control device as viewed from the seat inner side.
Figure 7:
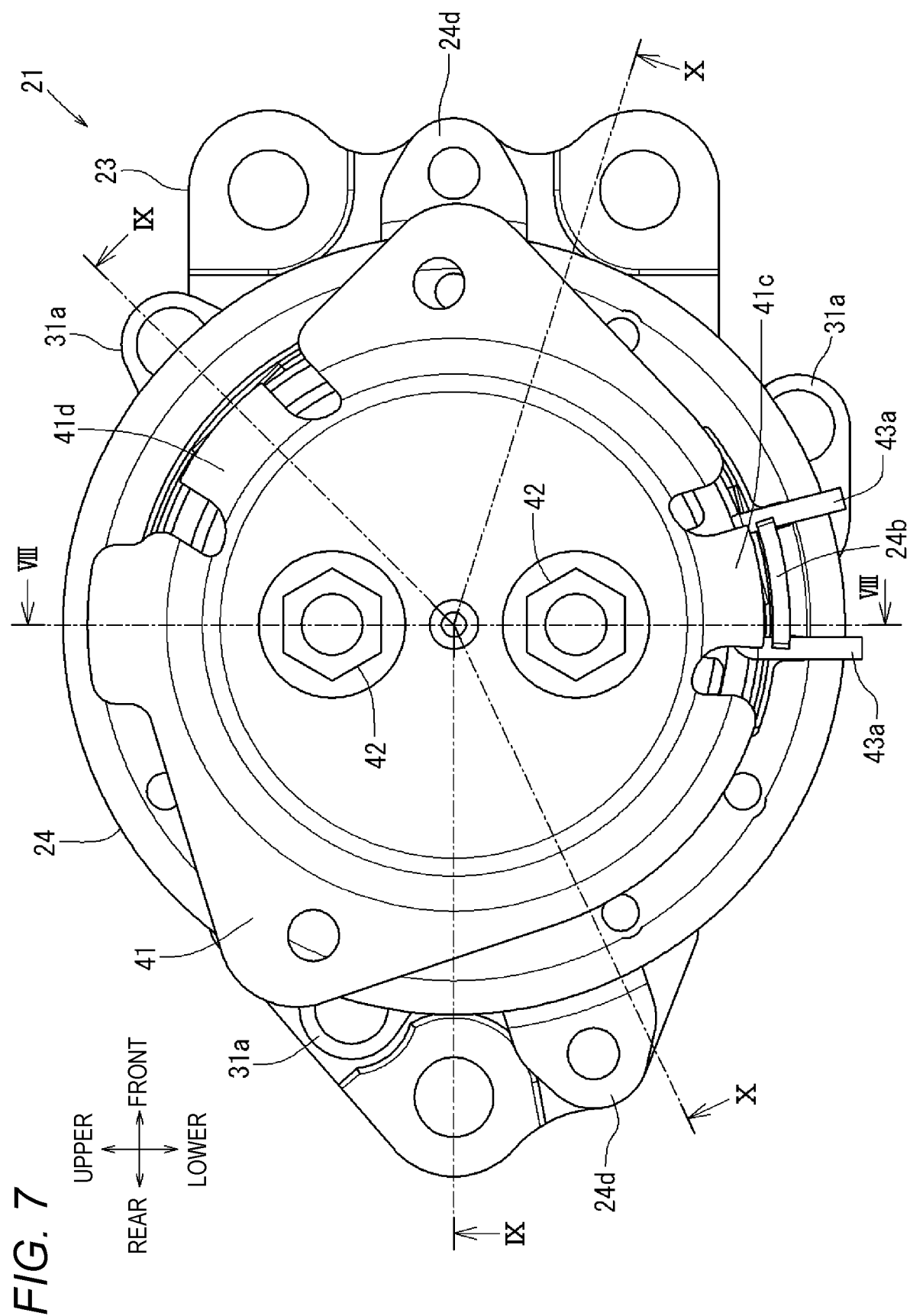
FIG. 7 is a front view of the rotation control device as viewed from the seat outer side.

FIG. 4 shows a schematic configuration of the rotation control device 21. A rotation shaft 22 integrated with the pinion gear 18 is coupled to a lever 41 via a rotation drive mechanism A, so as to be driven by the lever 41 to rotate. The lever 41 is integrally coupled to the operation handle 20. The rotation drive mechanism A includes a rotation plate 53, feed pawls 52, and a feed gear 36. The feed pawls 52 are normally separated from the feed gear 36 (a gap is present between the feed pawls 52 and the feed gear 36), and after the rotation plate 53 is rotated by a predetermined amount, the feed pawls 52 can mesh with the feed gear 36.

An operation plate 34 of a lock mechanism B is also rotatably coupled to the lever 41 together with the rotation plate 53. The operation plate 34 can operate pawls 32 and 33 of the lock mechanism B, and can operate clutch portions 59a. The clutch portions 59a can be operated only when the operation plate 34 is rotated in a direction of lowering the seat 1. When the clutch portions 59a are operated, the friction generation unit 57 is configured to apply a frictional force to rotation of a lock plate 30 of the lock mechanism B. The lock mechanism B can lock the rotation of the rotation shaft 22 via a speed increasing mechanism 25 by the pawls 32 and 33 meshing with the lock plate 30. The speed increasing mechanism 25 can increase a speed of the rotation of the rotation shaft 22 and transmit the rotation to the lock plate 30.

When the operation handle 20 is operated to lower the seat 1, the rotation shaft 22 is rotated by the rotation drive mechanism A, and the seat 1 is lowered. At this time, before the rotation shaft 22 is rotated, the clutch portions 59a are operated by the operation plate 34 to cause the friction generation unit 57 to function. Further, the pawls 33 related to the rotation of the lock plate 30 toward the lowering side is released from lock by the operation plate 34. As described above, due to a time delay from when the rotation plate 53 starts to rotate until the feed pawls 52 rotationally drive the feed gear 36, the rotation shaft 22 is rotated toward the lowering side after friction is applied to the rotation of the lock plate 30 by the friction generation unit 57 and the lock plate 30 is released from lock. When the seat 1 is to be lowered, since the gravity applied to the seat 1 also acts in a direction of lowering the seat 1 in addition to the operation force from the operation handle 20, the lowering speed of the seat 1 does not become faster than the operation on the operation handle 20 due to the function of the friction generation unit 57.

The rotation of the rotation shaft 22 is transmitted to the lock plate 30 via the speed increasing mechanism 25, and the lock plate 30 is rotated at a higher speed than the rotation shaft 22. Therefore, it is possible to reduce the frictional force of the friction generation unit 57 with respect to the lock plate 30, which is required to suppress the rotation of the rotation shaft 22.

When the operation in the direction of lowering the seat 1 by the operation handle 20 is finished, the rotation of the operation plate 34 returns to an original state, the lock mechanism B comes into a locked state, and the clutch portions 59a stop the function of the friction generation unit 57. At this time, since the lock mechanism B comes into the locked state, the pawls 33 and the lock plate 30 tend to mesh with each other, but if they are still not in a completely meshed state, the lock plate 30 is rotated due to the gravity of the seat 1 via the rotation shaft 22 and the speed increasing mechanism 25. When the pawls 33 and the lock plate 30 are in the completely meshed state, the rotation of the lock plate 30 is stopped. Such rotation of the lock plate 30 causes a problem that the seat 1 is slightly lowered when the operation on the operation handle 20 is finished. However, in this embodiment, when the rotation of the lock plate 30 is transmitted to the rotation shaft 22 via the speed increasing mechanism 25, the rotation speed of the lock plate 30 is reduced to about ⅕, for example, and the lowering amount of the seat 1 is slight as compared with the rotation amount of the lock plate 30. In addition, when the load applied to the seat 1 is transmitted from the rotation shaft 22 to the lock plate 30 via the speed increasing mechanism 25, the load is reduced in accordance with the speed increase, and the noise or shock generated when the pawls 33 and the lock plate 30 are in the completely meshed state is smaller than that in a case without increasing the speed.

When the operation handle 20 is operated to lift the seat 1, meshing of the pawls 32 with the lock plate 30 related to lifting of the seat 1 is released prior to the rotation of the rotation shaft 22 by the rotation drive mechanism A. On the other hand, the clutch portions 59a are not operated by the operation plate 34, and the friction generation unit 57 is not caused to function. Therefore, the operating force of the operation handle 20 is prevented from increasing due to the frictional force with respect to the rotation of the lock plate 30. That is, when the seat 1 is lifted, in contrast to when the seat 1 is lowered, the seat 1 needs to be lifted against the gravity applied to the seat 1, so that the operating force of the operation handle 20 increases. At this time, the frictional force of the friction generation unit 57 is prevented from being applied to the rotation of the lock plate 30 so that the operating force does not become unnecessarily large.

After the lock mechanism B is released from lock, the feed gear 36 is driven by the feed pawl 52 to rotate, the rotation shaft 22 is rotated, and the seat 1 is lifted. When the operation of lifting the seat 1 is completed, the lock plate 30 is rotated toward the completely meshed state between the pawls 32 and the lock plate 30 in the same manner as when the operation of lowering the seat 1 is completed. Also in this case, due to the action of the speed increasing mechanism 25, the lowering amount of the seat 1 is suppressed, and the noise and shock are also suppressed.

In this embodiment, as described above, by setting the gap between the feed pawls 52 and the feed gear 36, the lock mechanism B can be released from lock before the rotation shaft 22 is driven to rotate, so that the lowering operation and the lifting operation of the seat 1 can be performed smoothly, without providing an operation force transmission delay mechanism as a separate member as in the related art.

<Specific Example of Rotation Control Device 21>

FIGS. 5 to 21 show the rotation control device 21 in a state of being detached from the seat cushion 2. For reference numerals of constituent members of the rotation control device 21 to be described below, references will be made to any of FIGS. 5 to 21 as appropriate.

The rotation control device 21 is assembled such that the rotation shaft 22 penetrates a center hole 23c of a support member 23 serving as a base and the pinion gear 18 projects from a left side surface of the support member 23. The support member 23 is fixed to the side frame 13 in a state where the pinion gear 18 penetrates the through hole 13a of the side frame 13 (see FIG. 3).

A right side surface of the support member 23 is embossed leftward to form a guide concave portion 23b, and has a circular container shape as a whole. A carrier 28 of a planetary gear mechanism that is spline-coupled to an outer periphery of the rotation shaft 22 is accommodated in the guide concaved portion 23b (see FIGS. 8 and 9). The planetary gear mechanism constitutes the speed increasing mechanism 25, and includes three planetary gears 27 rotatably supported on the carrier 28, a sun gear 29 that is surrounded and rotated by these planetary gears 27, and the carrier 28. An inner peripheral surface of the guide concaved portion 23b is formed with an internal gear 26 that meshes with the three planetary gears 27. The sun gear 29 is formed integrally with a rotation center of a sun gear plate 29a. An outer peripheral side of the sun gear plate 29a is fitted to an inner peripheral side of the circular ring-shaped lock plate 30 (see FIG. 18). A plurality of projections 29b formed on the outer periphery of the sun gear plate 29a mesh with internal teeth 30a of the lock plate 30, and the sun gear plate 29a and the lock plate 30 are integrally coupled in the rotational direction. Therefore, when the sun gear 29 serving as an output of the speed increasing mechanism 25 is rotated, the lock plate 30 slides and rotates on the right side surface of the support member 23.

Figure 8:
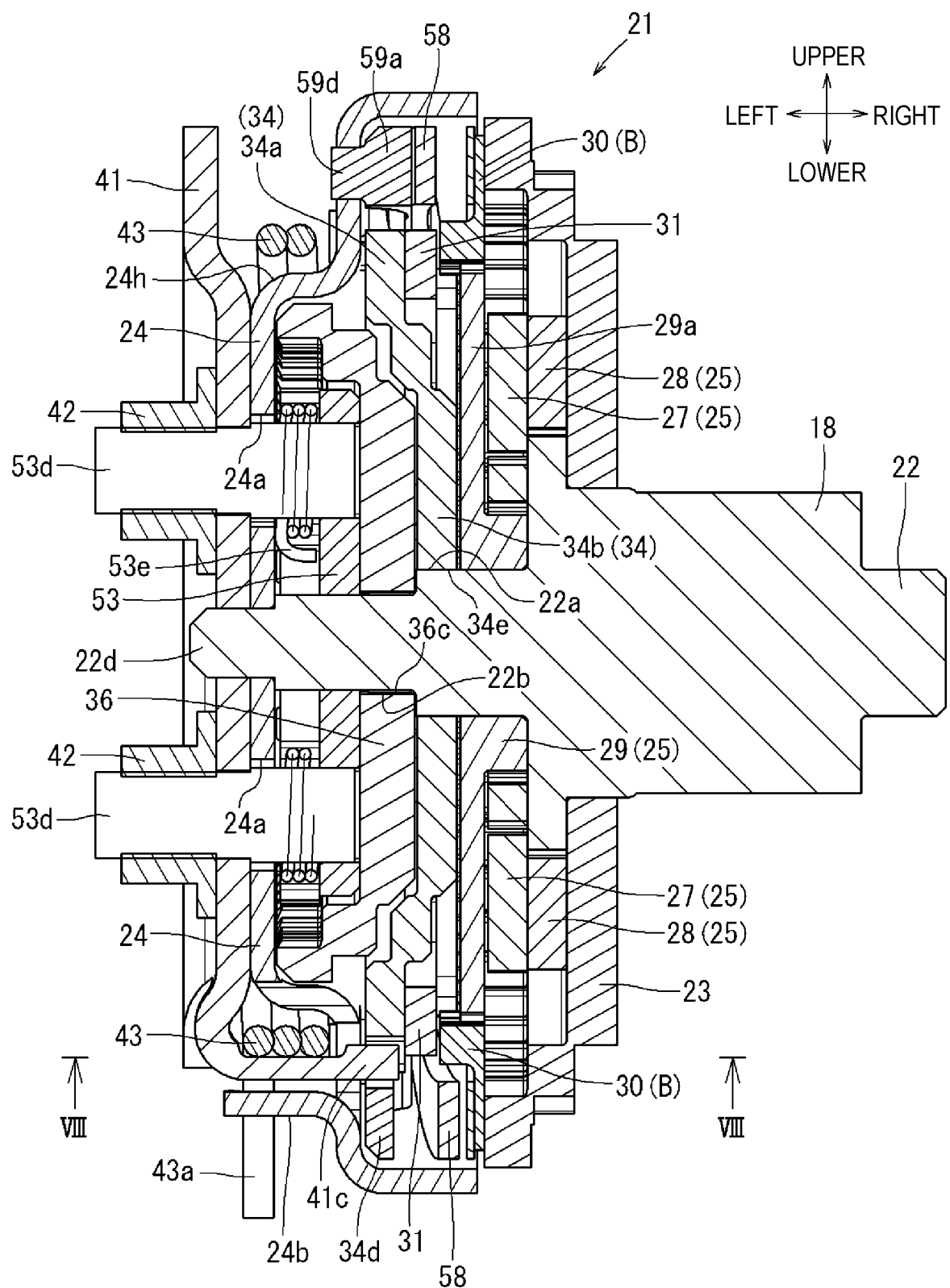
FIG. 8 is a cross-sectional view taken along line VIII-VIII in FIG. 7.
Figure 9:
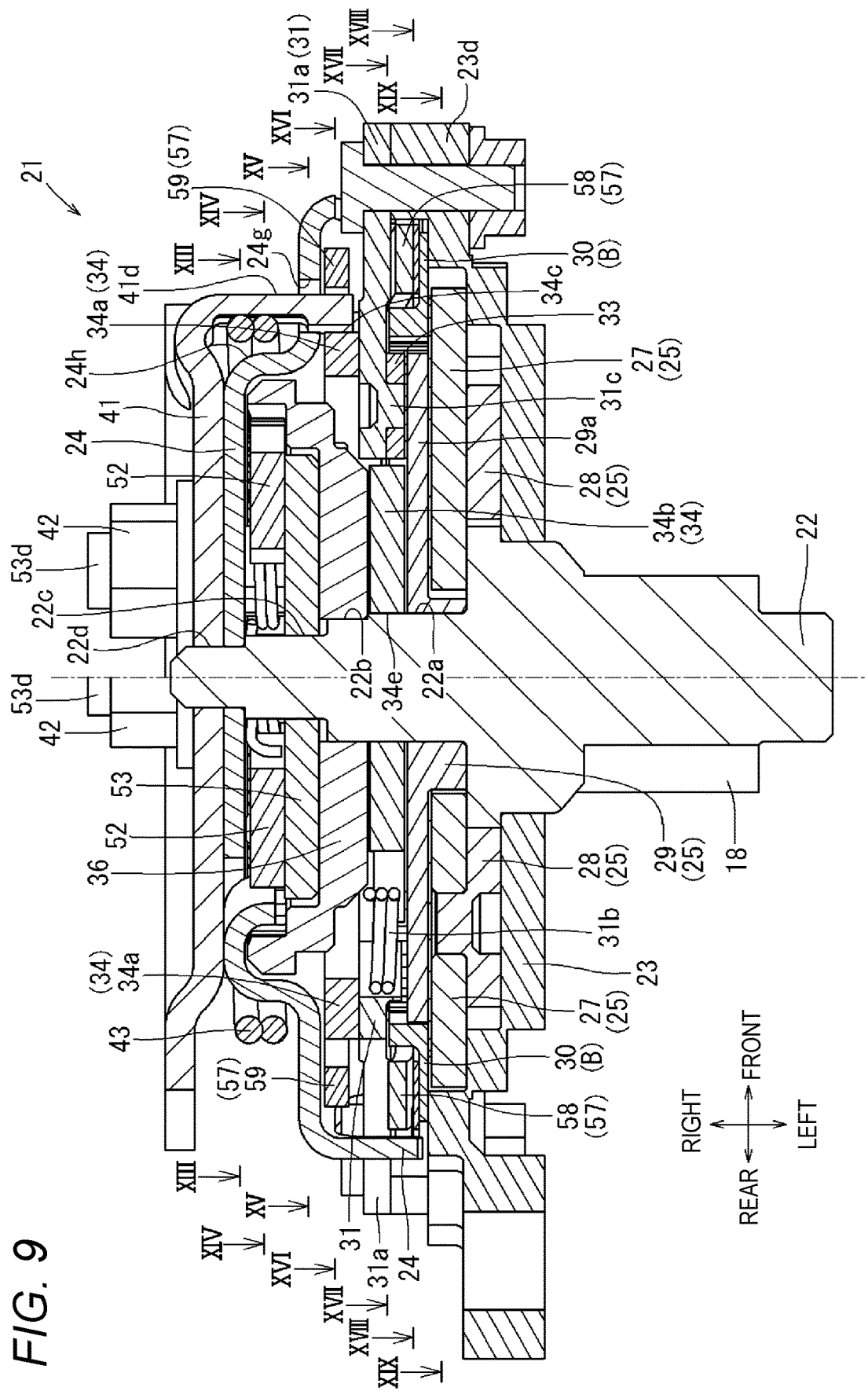
FIG. 9 is a cross-sectional view taken along line IX-IX in FIG. 7.
Figure 10:
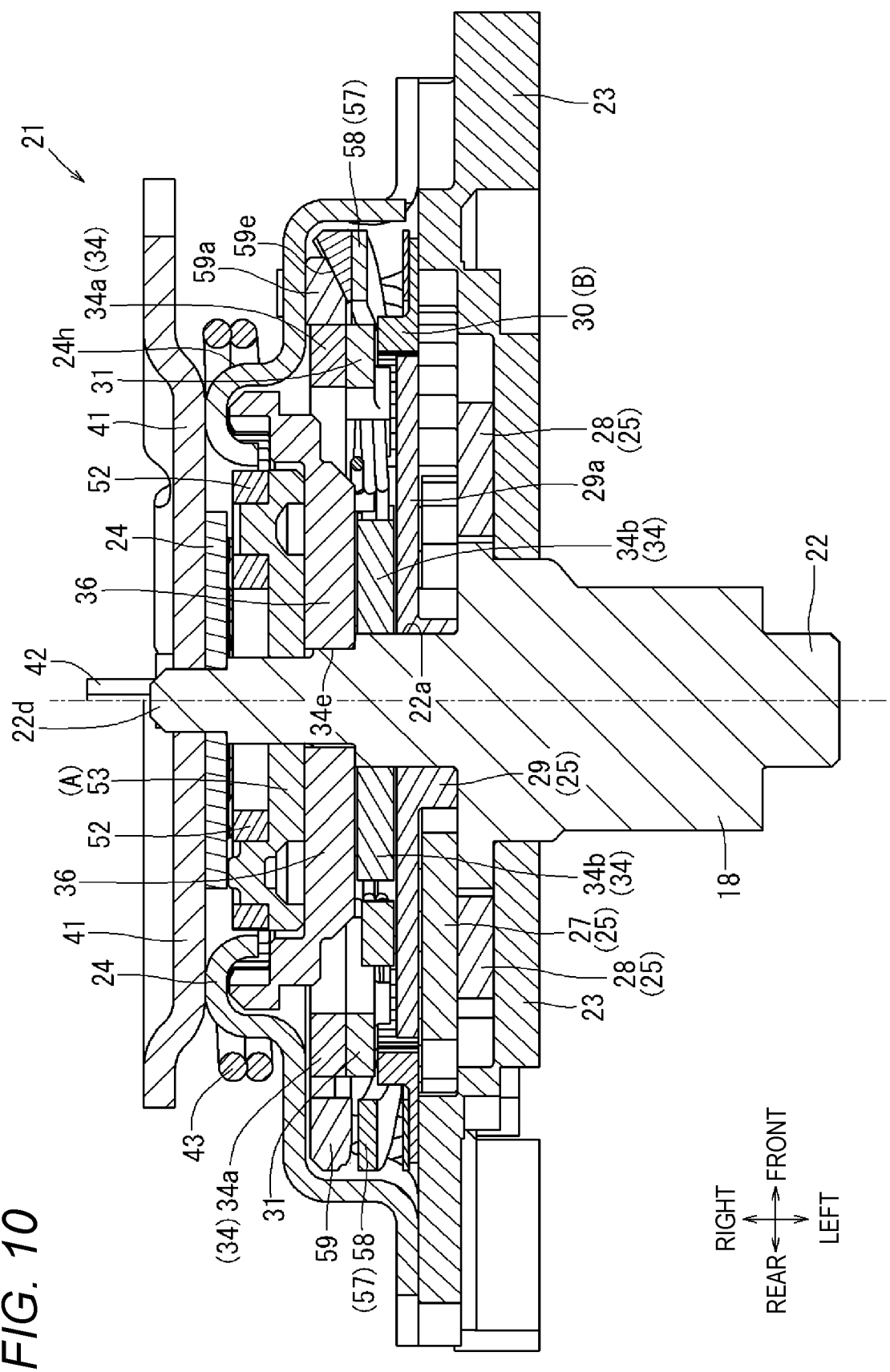
FIG. 10 is a cross-sectional view taken along line X-X in FIG. 7.
Figure 11:
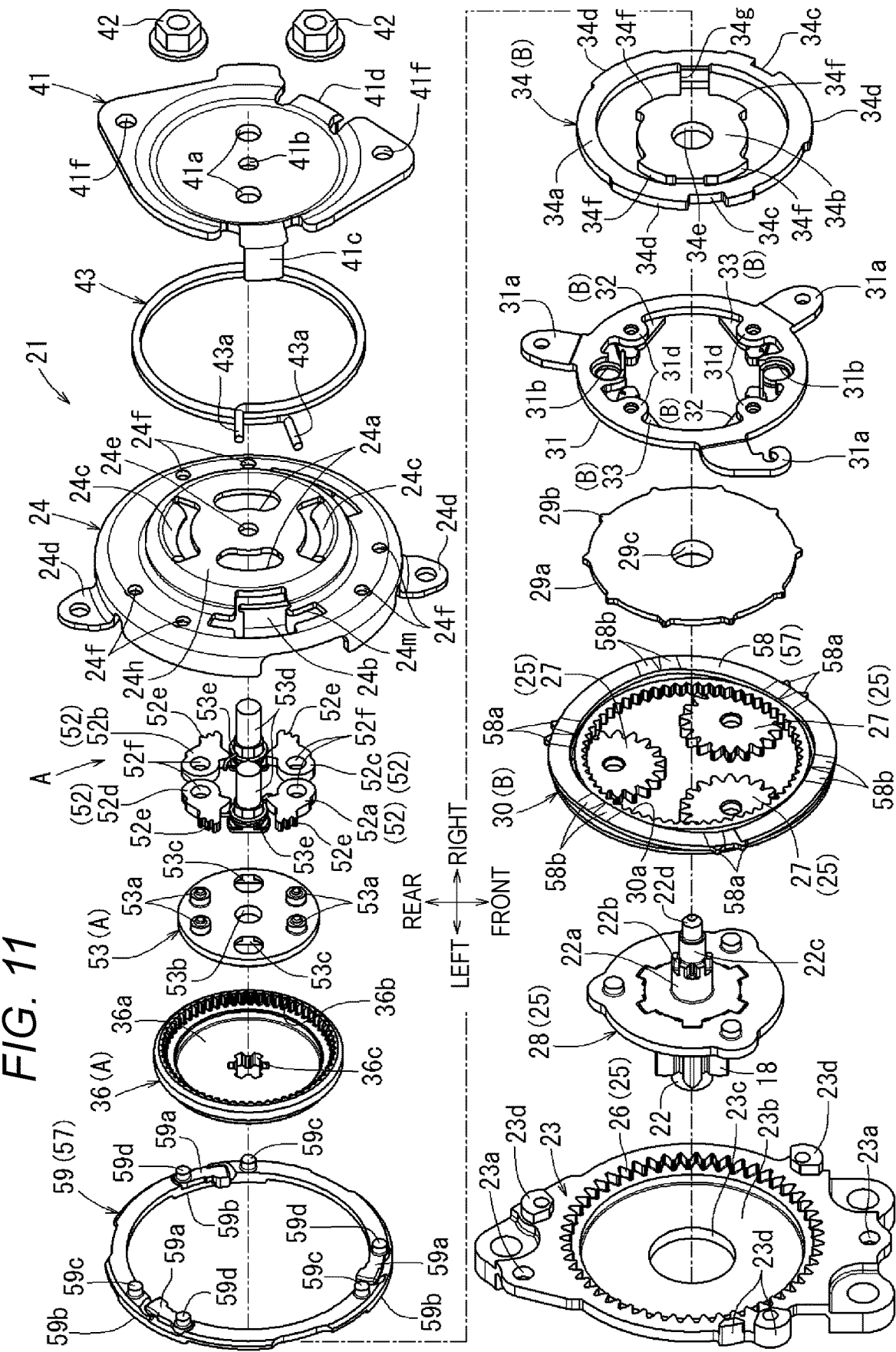
FIG. 11 is an exploded perspective view of the rotation control device as viewed from the seat outer side.
Figure 12:
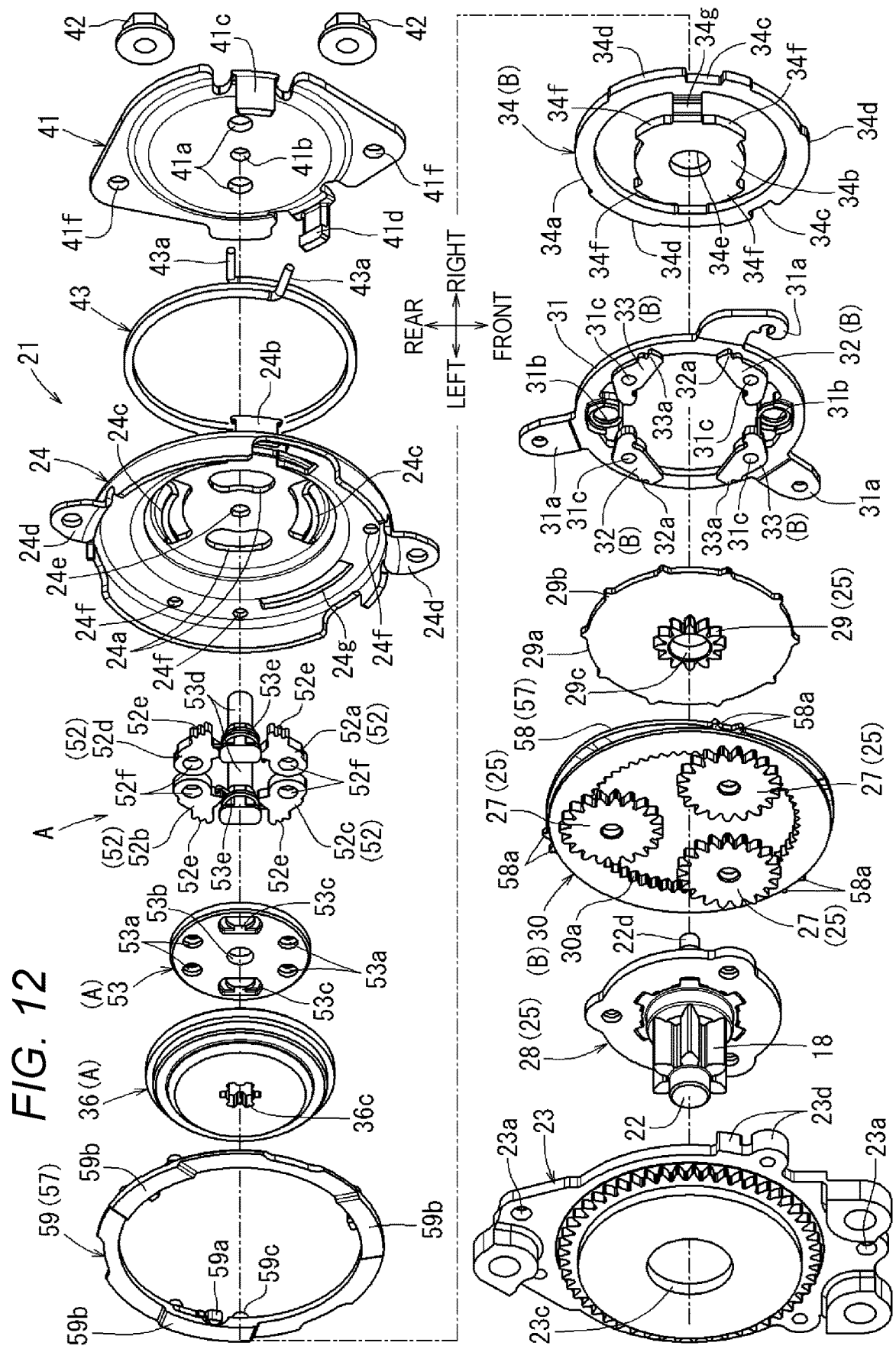
FIG. 12 is an exploded perspective view of the rotation control device as viewed from the seat inner side.

On a right side surface of the lock plate 30, a friction spring 58 and a pressing plate 59 each having a circular ring shape are provided so as to overlap each other in a face-to-face manner (see FIGS. 8 to 10). The friction spring 58 is made of a spring material and is curved so as to form three waveforms on the circumference, and a waveform surface thereof is elastically deformable in a left-right direction. Engagement pawls 58a are formed so as to project outward in a radial direction at each of three projecting portions in contact with the right side surface of the lock plate 30 on the waveform surface of the friction spring 58. A pair of the engagement pawls 58a are provided at each of the three positions, and the pair of engagement pawls 58a are engaged with each of three engagement projections 23d of the support member 23 in a manner sandwiching the engagement projection 23d in the rotational direction (see FIG. 18). Three projecting portions 58b projecting rightward in the waveform surface of the friction spring 58 abut against and are in contact with a pressing surface 59b of the pressing plate 59. The pressing surface 59b projects leftward from a general surface of the pressing plate 59. On a right side surface of the pressing plate 59, projections 59c are formed at three positions on a surface opposite to the pressing surface 59b. The projections 59c are fitted into through holes 24f of the cover 24, which will be described later, to fix the pressing plate 59 in the rotational direction.

The clutch portions 59a are respectively provided adjacent to the three projections 59c on the right side surface of the pressing plate 59. As shown in an enlarged view in FIG. 21, each clutch portion 59a is a member that is arranged along the ring shape of the pressing plate 59 and is rotatable around one end thereof on the right side surface of the pressing plate 59, and the one end serving as a rotation center is formed with a projection 59d projecting rightward. As shown in a solid line in FIG. 21 (showing a state in which the clutch portion 59a is separated from the pressing plate 59), an abutting surface 59f is formed on the other end (rotating end) of the clutch portion 59a so as to face the right side surface of the pressing plate 59. Similarly to the projection 59c, the projection 59d is fitted into one of the through holes 24f of the cover 24 described later, and the clutch portion 59a is rotatably supported around the projection 59d. A cam surface 59e is formed in a portion of the right side surface of the pressing plate 59 where the abutting surface 59f of the clutch portion 59a abuts. The cam surface 59e is a spiral surface centered on an axis of the rotation shaft of the clutch portion 59a (projection 59d). The spiral surface bulges rightward continuously from the inner peripheral side toward the outer peripheral side of the pressing plate 59. A projecting portion 59g is formed on the inner peripheral side of the abutting surface 59f of the clutch portion 59a, and the projecting portion 59g projects toward the inner peripheral side of the ring shape of the pressing plate 59 when the clutch portion 59a is placed along the ring shape of the pressing plate 59.

Figure 20:
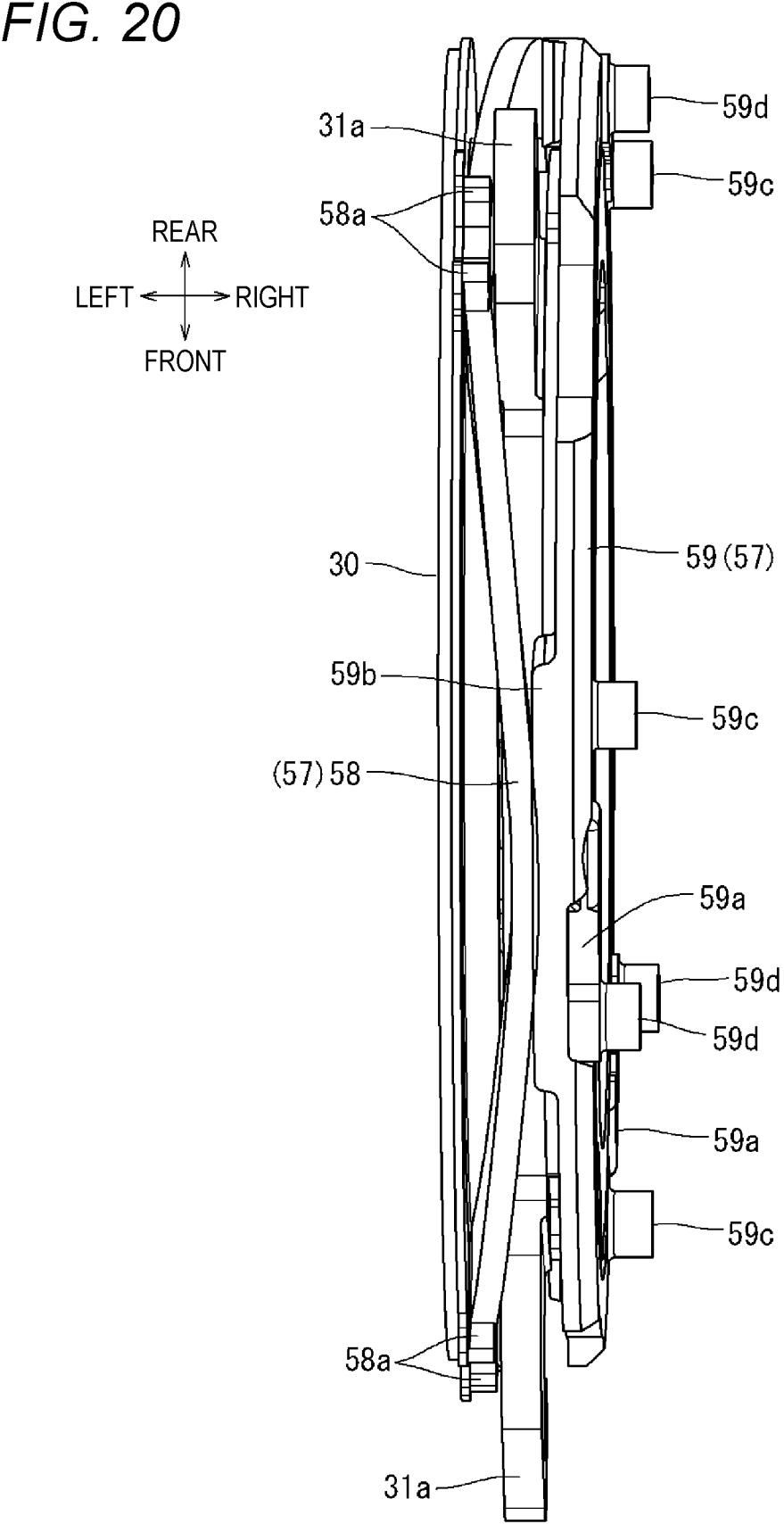
FIG. 20 is a perspective view showing an assembled state of a friction spring, a pressing plate, and a pawl holder of the rotation control device.
Figure 21:
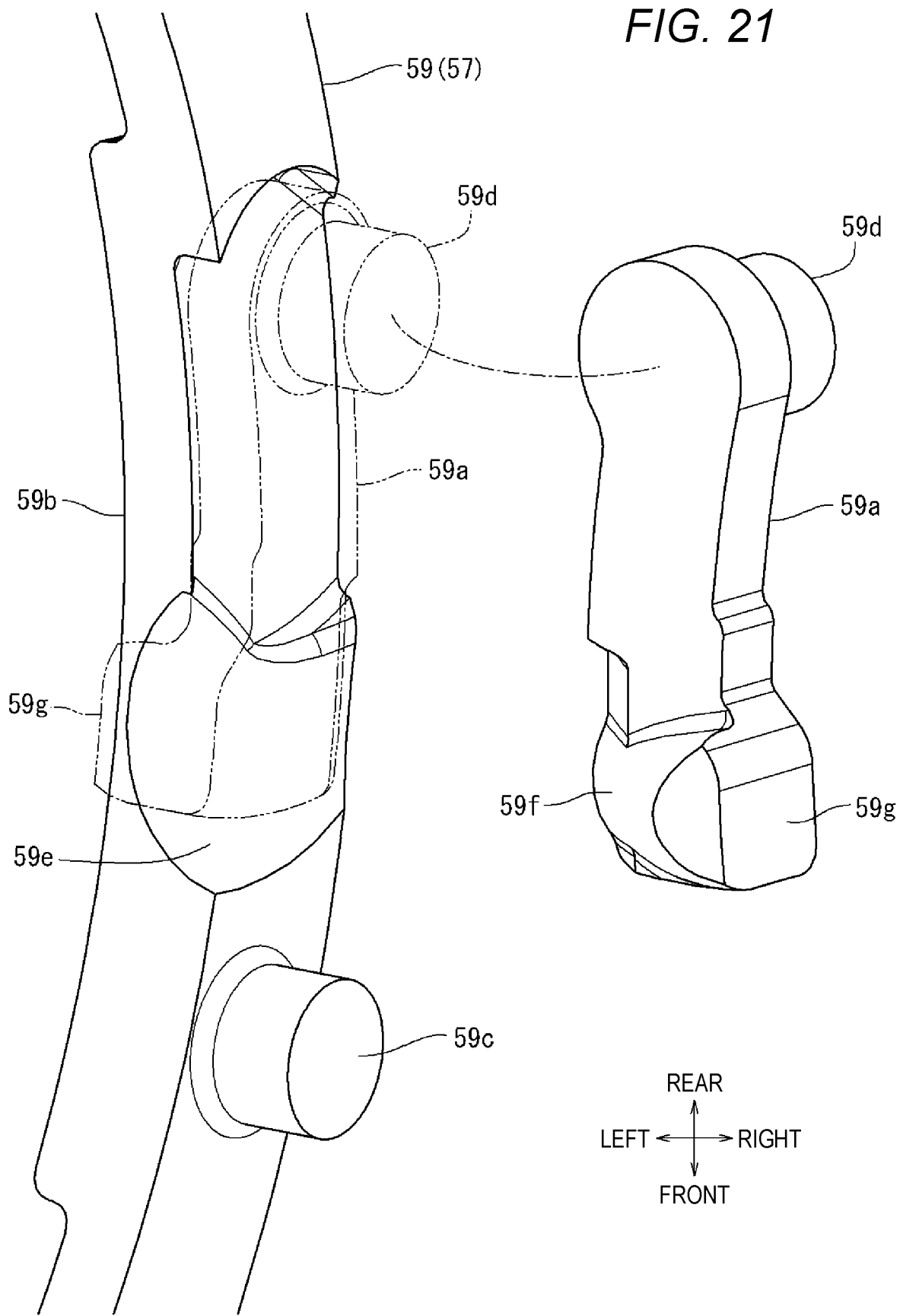
FIG. 21 is a perspective view showing an assembled state of a clutch portion in the pressing plate of the rotation control device.

A pawl holder 31 is provided on the right side of the lock plate 30 so as to be flush with the lock plate 30 (see FIGS. 8 to 10). The pawl holder 31 has a ring shape similar to that of the lock plate 30, includes leg portions 31a projecting radially outward at three positions on an outer peripheral side thereof, and includes four pawls 32 and 33 on an inner peripheral side thereof. As shown in FIG. 20, each leg portion 31a is inserted into a gap along the waveform surface of the friction spring 58 that is formed between the pressing plate 59 and the friction spring 58. Each leg portion 31a is fixed to one of the engagement projections 23d of the support member 23 by a bolt and a nut (see FIG. 9). Further, the pawls 32 and the pawls 33, which respectively face each other in the radial direction of the pawl holder 31, are rotatably supported by projections 31c of support pieces 31d projecting radially inward of the pawl holder 31. The pawls 32 and 33 are urged by torsion springs 31b such that external teeth 32a, 33a formed at tips thereof mesh with the internal teeth 30a of the lock plate 30 (see FIG. 17). When the external teeth 32a of the pawls 32 mesh with the internal teeth 30a of the lock plate 30, rotation that is counterclockwise when viewed from the right side of the lock plate 30 is locked, which locks rotation in the direction of lifting the seat 1 of the rotation shaft 22. When the external teeth 33a of the pawls 33 mesh with the internal teeth 30a of the lock plate 30, rotation that is clockwise when viewed from the right side of the lock plate 30 is locked, which locks rotation in the direction of lowering the seat 1 of the rotation shaft 22.

Figure 16:
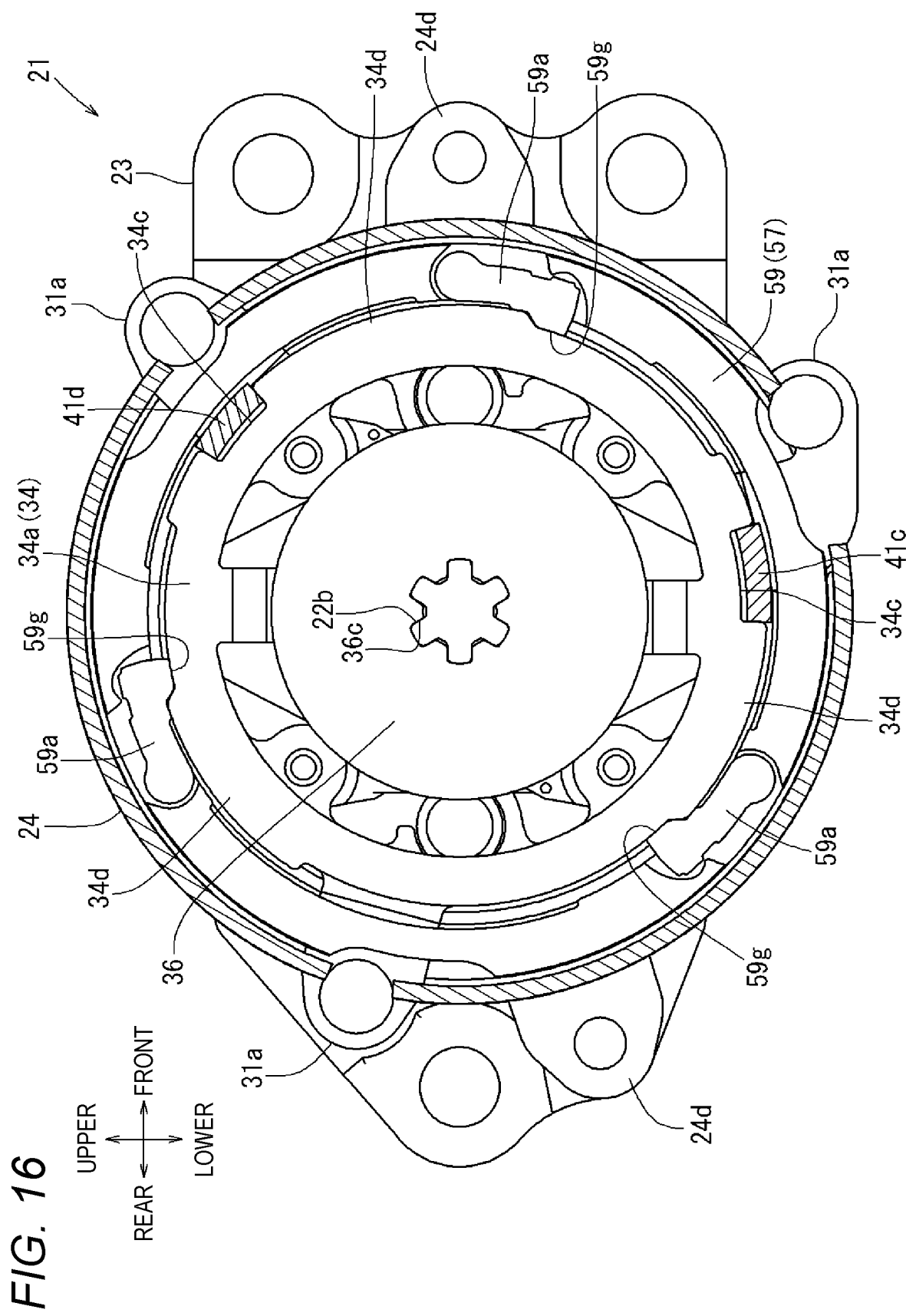
FIG. 16 is a cross-sectional view taken along line XVI-XVI of FIG. 9.
Figure 17:
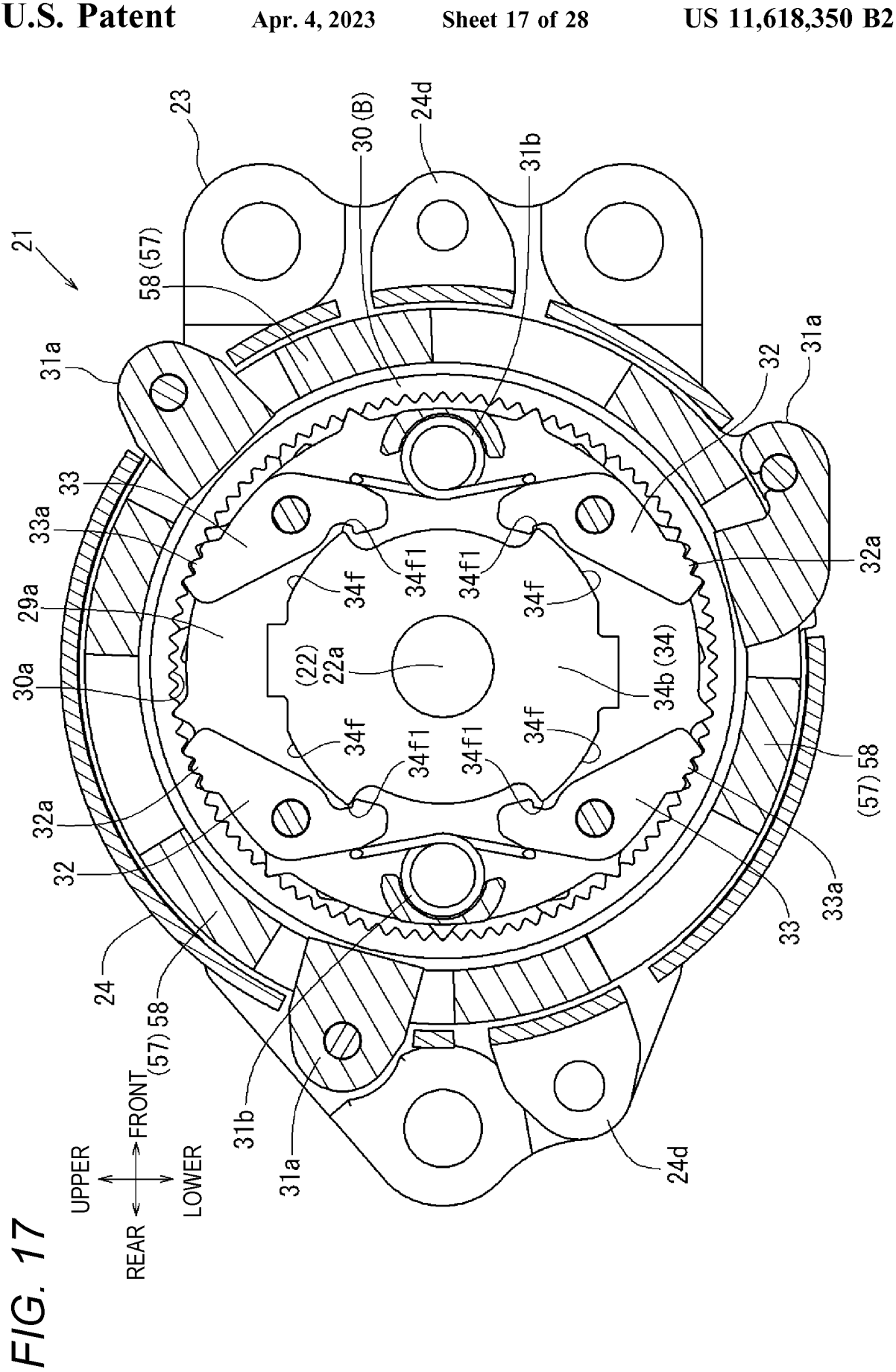
FIG. 17 is a cross-sectional view taken along line XVII-XVII in FIG. 9.
Figure 18:
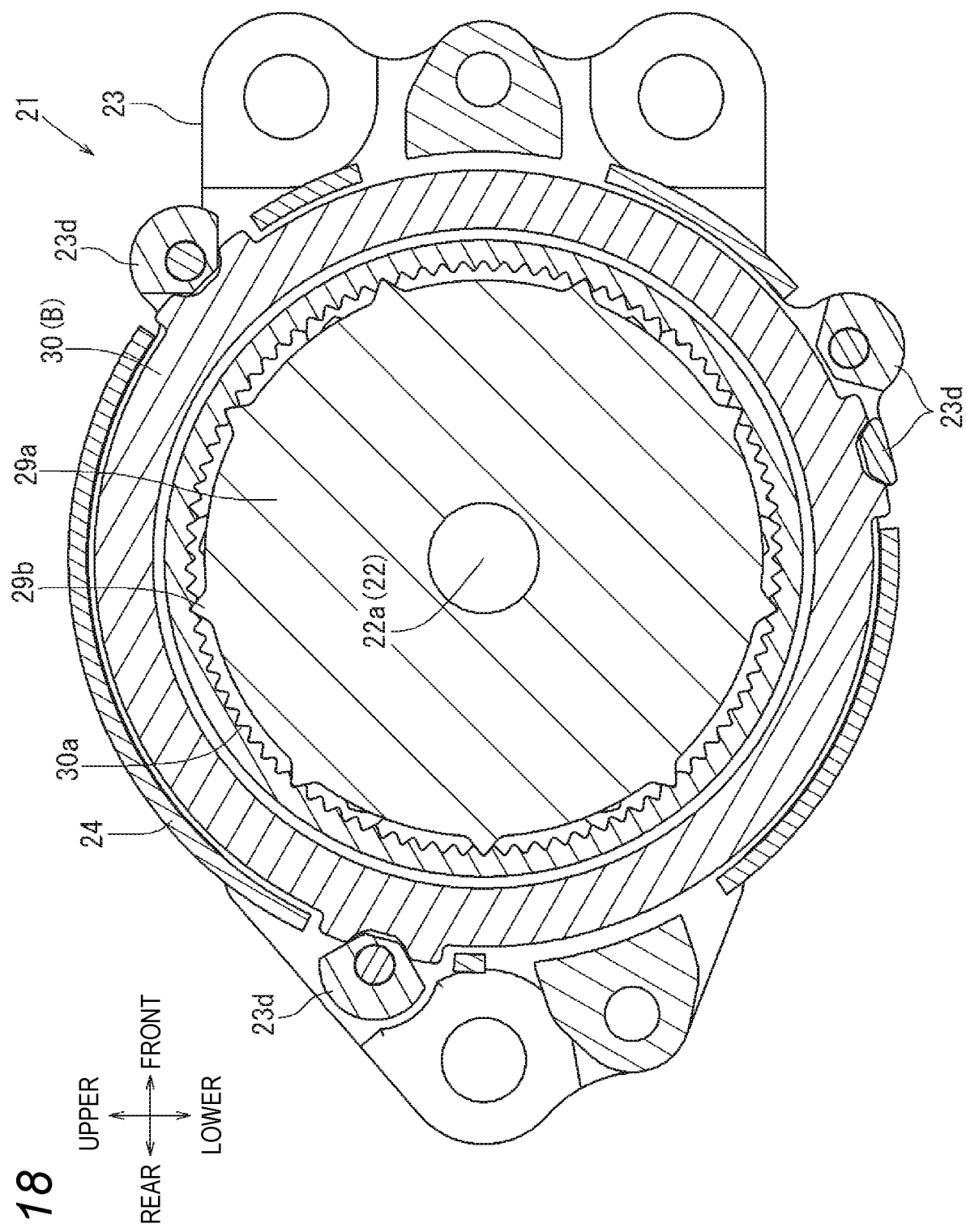
FIG. 18 is a cross-sectional view taken along line XVIII-XVIII in FIG. 9.
Figure 19:
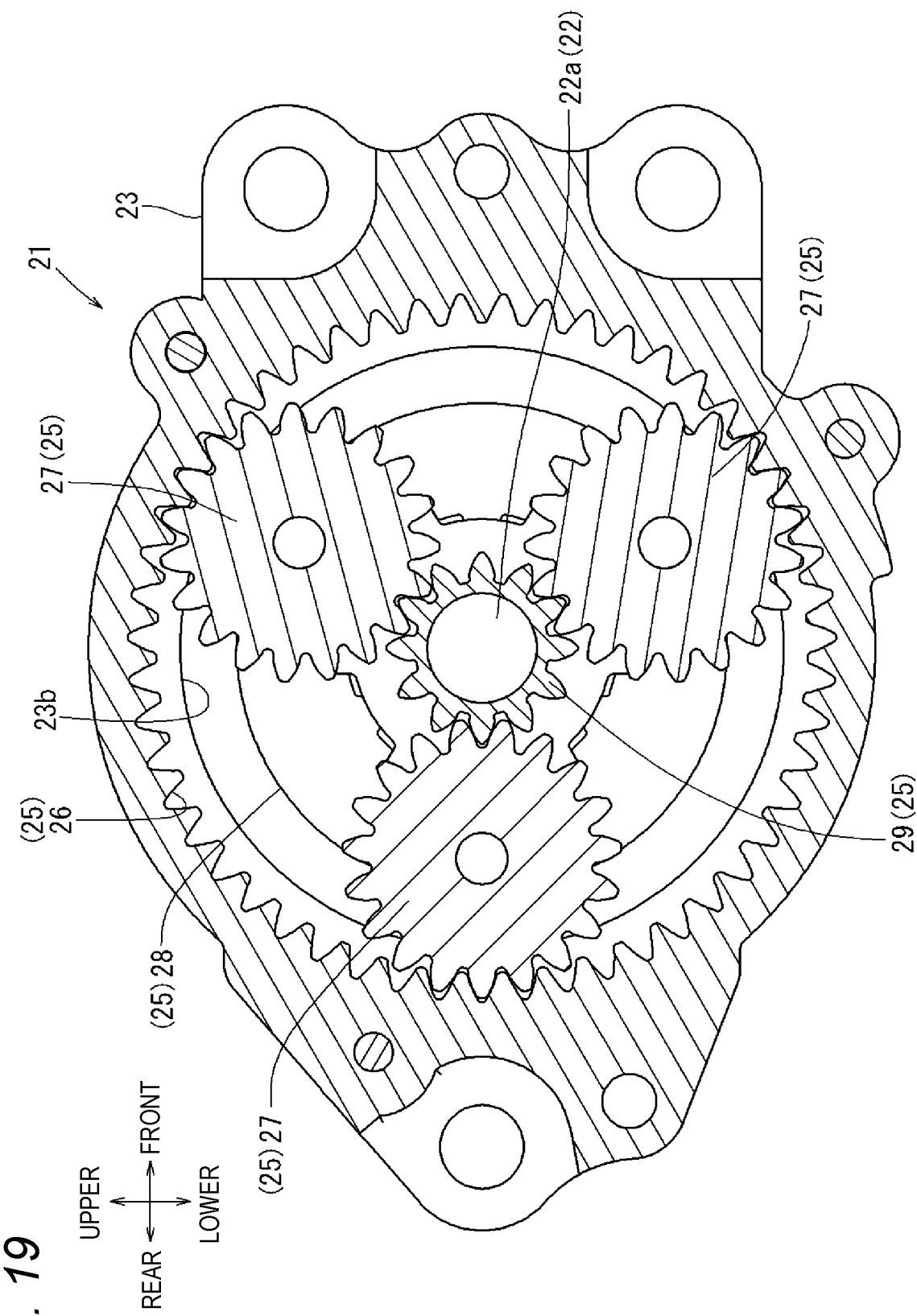
FIG. 19 is a cross-sectional view taken along line XIX-XIX in FIG. 9.

The operation plate 34 is provided on the inner peripheral side of the pressing plate 59 and the pawl holder 31 (see FIGS. 16 and 17). In the operation plate 34, an outer peripheral ring 34a and an inner peripheral ring 34b, which are ring-shaped and have a common center, are formed in a manner separated in the radial direction. The outer peripheral ring 34a and the inner peripheral ring 34b are integrated by two coupling portions 34g, and the outer peripheral surface 22a of the rotation shaft 22 is fitted into a through hole 34e at a center of the inner peripheral ring 34b, whereby the operation plate 34 is rotatably supported with respect to the rotation shaft 22 (see FIGS. 8 to 12). A pair of engagement portions 34c are formed on an outer peripheral side of the outer peripheral ring 34a, and engagement pieces 41c and 41d of the lever 41, which will be described later, are engaged with the engagement portions 34c, so that the operation plate 34 is driven by the lever 41 to rotate (see FIG. 16). Three first operating portions 34d project radially outward from the outer periphery of the outer peripheral ring 34a. Four second operating portions 34f projecting radially outward are formed on the outer periphery of the inner peripheral ring 34b.

As shown in FIG. 16, each first operating portion 34d of the outer peripheral ring 34a is disposed adjacent to each clutch portion 59a of the pressing plate 59, and the projecting portion 59g of the clutch portion 59a is pressed toward the radially outer side of the pressing plate 59 by the outer peripheral surface of the first operating portion 34d when the operation plate 34 is rotated in the direction of lowering the seat 1 by the lever 41. Therefore, the pressing plate 59 is moved to the left side in the axial direction of the rotation shaft 22 due to relative movement of the abutting surface 59f with respect to the cam surface 59e (see FIG. 21), and is pressed against the friction spring 58.

As shown in FIG. 17, each second operating portion 34f of the inner peripheral ring 34b is disposed adjacent to each of the pawls 32 and 33, and when the operation plate 34 is rotated in the direction of lowering or lifting the seat 1 by the lever 34, the pawl 32 or 33 are rotated by an engagement end 34f1 of the second operating portion 34f, and the pawl 32 or 33 is released from the state of meshing with the internal teeth 30a of the lock plate 30.

The feed gear 36 is provided on the right side of the operation plate 34 (see FIGS. 8 to 10). The feed gear 36 is formed by embossing a disk from the right side to the left side, and a concave portion 36a is formed on a right side face thereof. Internal teeth 36b are formed on an inner peripheral surface of the concave portion 36a. A spline fitting portion 36c that is coupled to the spline 22b of the rotation shaft 22 is formed at a center of the concave portion 36a (see FIG. 16).

As shown in FIGS. 8 to 10 and 14, the disk-shaped rotation plate 53 is arranged in the concave portion 36a on the right side of the feed gear 36. The rotation plate 53 has a through hole 53b at a center of the disk thereof fitted to the outer peripheral surface 22c of the rotation shaft 22, and thus is rotatable. Hinge portions 52f of the four (two pairs of) feed pawls 52 are respectively fitted to four hinge pins 53a on the right side surface of the rotation plate 53, so that the feed pawls 52 are rotatably supported on the rotation plate 53. A coupling rod 53d is fitted into each of two fitting holes 53c of the rotation plate 53. The coupling rod 53d is inserted into the fitting hole 53c from the left side of the rotation plate 53, so that a flange of the coupling rod 53d is fitted and fixed to the fitting hole 53c. A torsion spring 53e is fitted around the coupling rod 53d, and an engagement end 52e of each feed pawl 52 is engaged to an end of the torsion spring 53e, so as to be urged in a direction of meshing with the internal teeth 36b of the feed gear 36.

Figure 14:
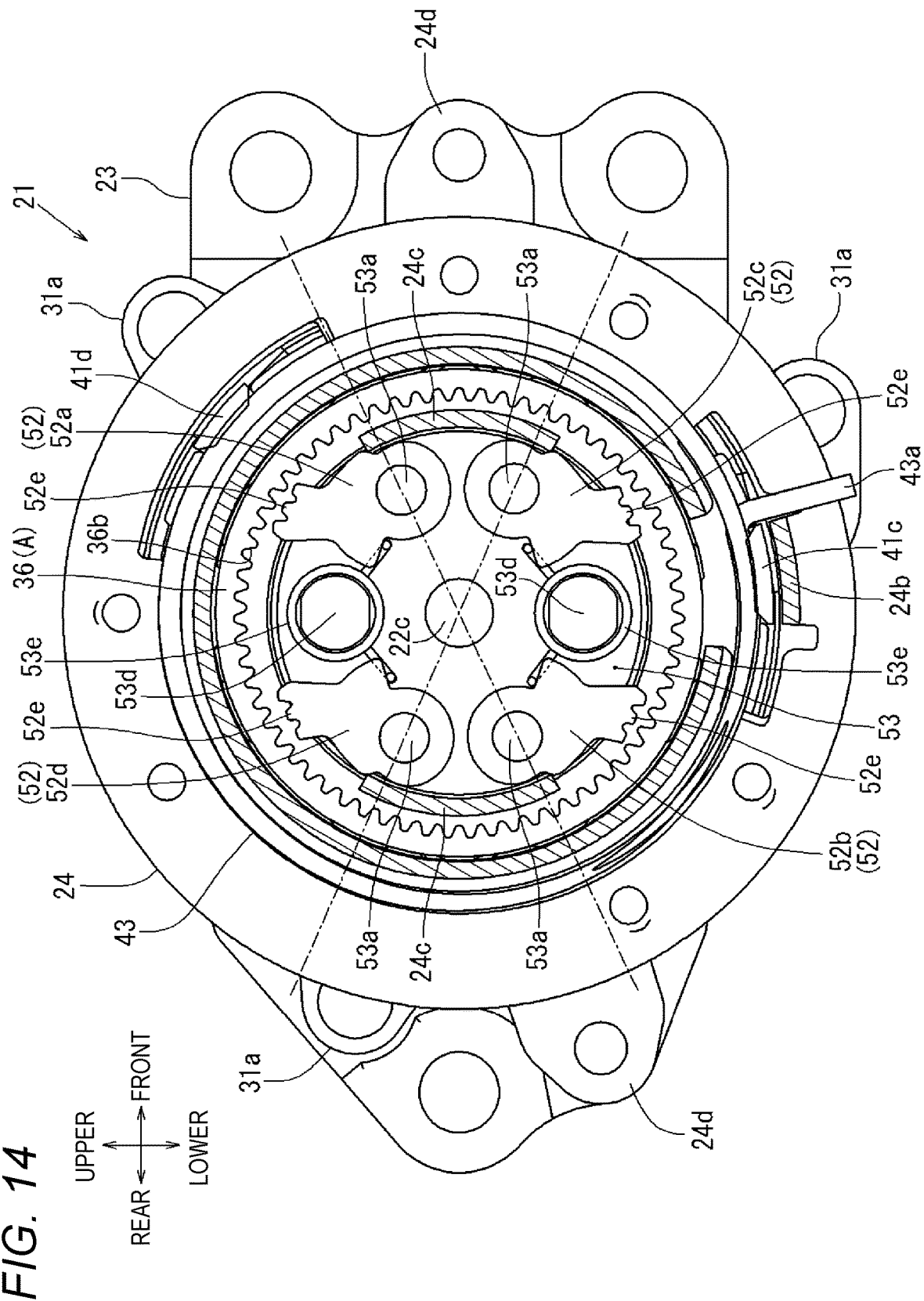
FIG. 14 is a cross-sectional view taken along line XIV-XIV in FIG. 9.
Figure 15:
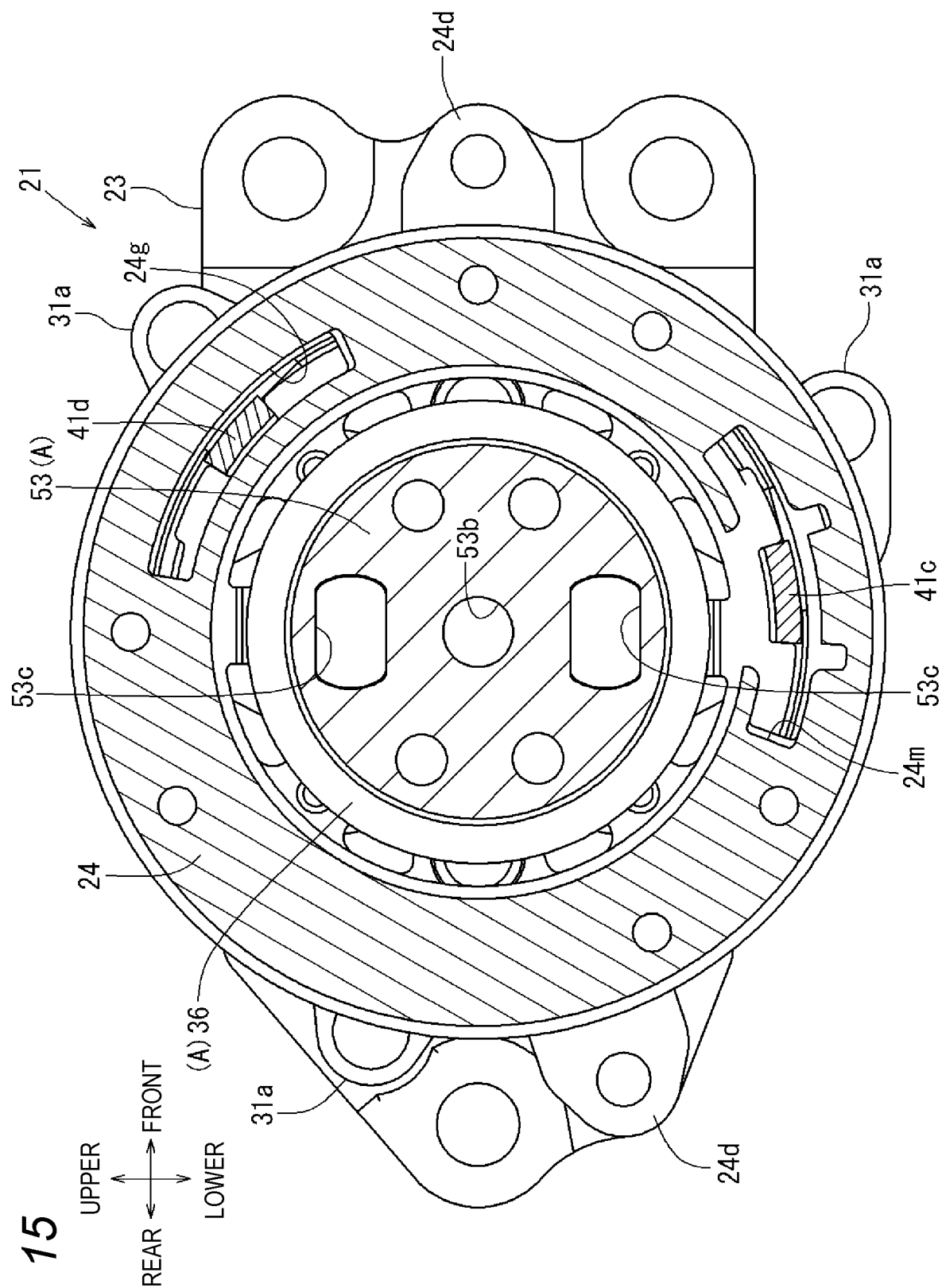
FIG. 15 is a cross-sectional view taken along line XV-XV in FIG. 9.

As shown in FIG. 14, the feed pawls 52 includes lifting-side feed pawls 52a, 52b, and lowering-side feed pawls 52c, 52d. The hinge pins 53a serving as rotation shafts of the lifting-side feed pawls 52a and 52b are on a virtual straight line passing through the rotation center of the rotation plate 53 (the center of the outer peripheral surface 22c of the rotation shaft 22), and are supported to face each other across the rotation center thereof. The hinge pins 53a serving as rotation shafts of the lowering-side feed pawls 52c and 52d are also on a virtual straight line passing through the rotation center of the rotation plate 53 (the center of the outer peripheral surface 22c of the rotation shaft 22), and are supported to face each other across the rotation center thereof. On the other hand, the number of teeth of the internal teeth 36b of the feed gear 36 is an odd number (for example, 63). As a result, meshing phases of the engagement ends 52e of the lifting-side feed pawl 52a and the lowering-side feed pawl 52c with respect to the internal teeth 36b are shifted by half teeth of the internal teeth 36b with respect to meshing phases of the engagement ends 52e of the lifting-side feed pawl 52b and the lowering-side feed pawl 52d, respectively. Therefore, when the rotation plate 53 is operated toward the lifting side upon the operation on the operation handle 20, the lifting-side feed pawls 52a and 52b do not mesh with the internal teeth 36b simultaneously, and either one meshes first due to the difference of the meshing phases with respect to the internal teeth 36b. Similarly, when the rotation plate 53 is operated toward the lowering side, the lowering-side feed pawls 52c and 52d do not mesh with the internal teeth 36b simultaneously, and either one meshes first due to the difference of the meshing phases with respect to the internal teeth 36b. Which one of the lifting-side feed pawls 52a and 52b meshes first and which one of the lowering-side feed pawls 52c and 52d meshes first depend on a rotational position of the feed gear 36 at that time.

A cover 24 covers the right side of the feed pawls 52 (see FIGS. 9 and 10). The cover 24 is fixed to the support member 23 by leg portions 24d projecting to an outer peripheral side thereof. The fixing is performed by causing a bolt (not shown) to penetrate through a through hole of the leg portion 24d and the through hole 23a of the support member 23. An end 22d of the rotation shaft 22 is fitted into the center hole 24e of the cover 24, so that the rotation shaft 22 is rotatably supported between the cover 24 and the support member 23. Accordingly, the cover 24 constitutes a support member of the rotation shaft 22 together with the support member 23.

With the cover 24 covering the support member 23 in this manner, tips of the coupling rods 53d respectively penetrate through penetrating holes 24a and projects rightward from a right side surface of the cover 24 (see FIG. 8). Further, a pair of erected pieces 24c of the cover 24 are respectively in contact with the feed pawls 52 as shown in FIG. 14. As a result, in a state in which the lever 41 is not operated, the engagement end 52e of each feed pawl 52 is returned to a fixed position separated from the internal teeth 36b of the feed gear 36 regardless of the urging force of the torsion spring 53e. The pair of erected pieces 24c correspond to the release pieces of the present disclosure.

A torsion spring 43 is disposed on the outer side (right side) of the cover 24 (see FIGS. 8 to 10). The cover 24 projects rightward on an inner peripheral side thereof with the pair of erected pieces 24c and the pair of penetrating holes 24a as a boundary line, and the torsion spring 43 is disposed around this projecting portion 24h. The lever 41 is arranged on the right side of the projecting portion 24h of the cover 24 (see FIGS. 8 to 10). The end 22d of the rotation shaft 22 is fitted to a center hole 41b of the lever 41, so that the rotation shaft 22 is rotatable with respect to the rotation shaft 22. The tips of the coupling rods 53d are respectively inserted into through holes 41a formed on the lever 41 so as to sandwich the center hole 41b, and nuts 42 are respectively screwed to the coupling rods 53d to fix the lever 41 to the cover 24 (see FIG. 8).

The engagement pieces 41c and 41d are formed so as to project leftward from the outer peripheral side of the lever 41, and the engagement piece 41c is inserted into an erected hole 24m adjacent in a face-to-face manner to an erected piece 24b that projects rightward on the outer peripheral side of the cover 24 (see FIG. 8). A tip of the engagement piece 41c is engaged with one of the engagement portions 34c formed on the outer peripheral ring 34a of the operation plate 34. The engagement piece 41d is inserted into an engagement hole 24g formed on the outer peripheral side of the cover 24, and a tip thereof is engaged with the other of the engagement portions 34c formed on the outer peripheral ring 34a of the operation plate 34 (see FIG. 9).

Ends 43a on both sides of the torsion spring 43 are bent outward in the radial direction of the torsion spring 43, which is wound in a ring shape. The torsion spring 43 is urged in a direction in which the ends 43a approach each other. Further, the ends 43a sandwich the erected piece 24b and the engagement piece 41c which are adjacent to each other in the face-to-face state. Therefore, when the lever 41 is rotated on the cover 24, in contrast to movement of the engagement piece 41c such that a facing area thereof with respect to the erected piece 24b is reduced, the torsion spring 43 functions as a return spring that returns them in a direction facing each other.

A pair of through holes 41f are formed at both ends of the lever 41 in the front-rear direction, and the operation handle 20 is fixed by using these through holes 41f.

In the above description, the rotation plate 53, the feed pawls 52, and the feed gear 36 correspond to the rotation drive mechanism A of the present disclosure. The operation plate 34, the pawls 32 and 33, and the lock plate 30 correspond to the lock mechanism B of the present disclosure.

<Operation of Rotation Control Device 21 (Operation Handle 20 not Operated)>

Hereinafter, a height adjustment operation of the seat cushion 2 via the rotation control device 21 will be described with reference to FIGS. 14, 17, and 22 to 28.

FIGS. 14 and 17 illustrate a state of the neutral position in which the operation handle 20 is not operated and the lever 41, the operation plate 34, and the rotation plate 53 are not rotated. At this time, as shown in FIG. 14, the feed pawls 52 are engaged with the erected pieces 24c while receiving the urging force of the torsion springs 53e, so that the engagement ends 52e are placed in fixed positions that do not mesh with the internal teeth 36b of the feed gear 36. Further, as shown in FIG. 17, the pawls 32 and 33 are in a state in which the external teeth 32a and 33a thereof are engaged with the internal teeth 30a of the lock plate 30 due to the urging force of the torsion springs 31b. Therefore, the rotation of the lock plate 30 is locked, and the height of the seat 1 is not changed to the lifting side or the lowering side.

<Action of Rotation Control Device 21 (Operation Handle 20 Pushed Down)>

Figure 22:
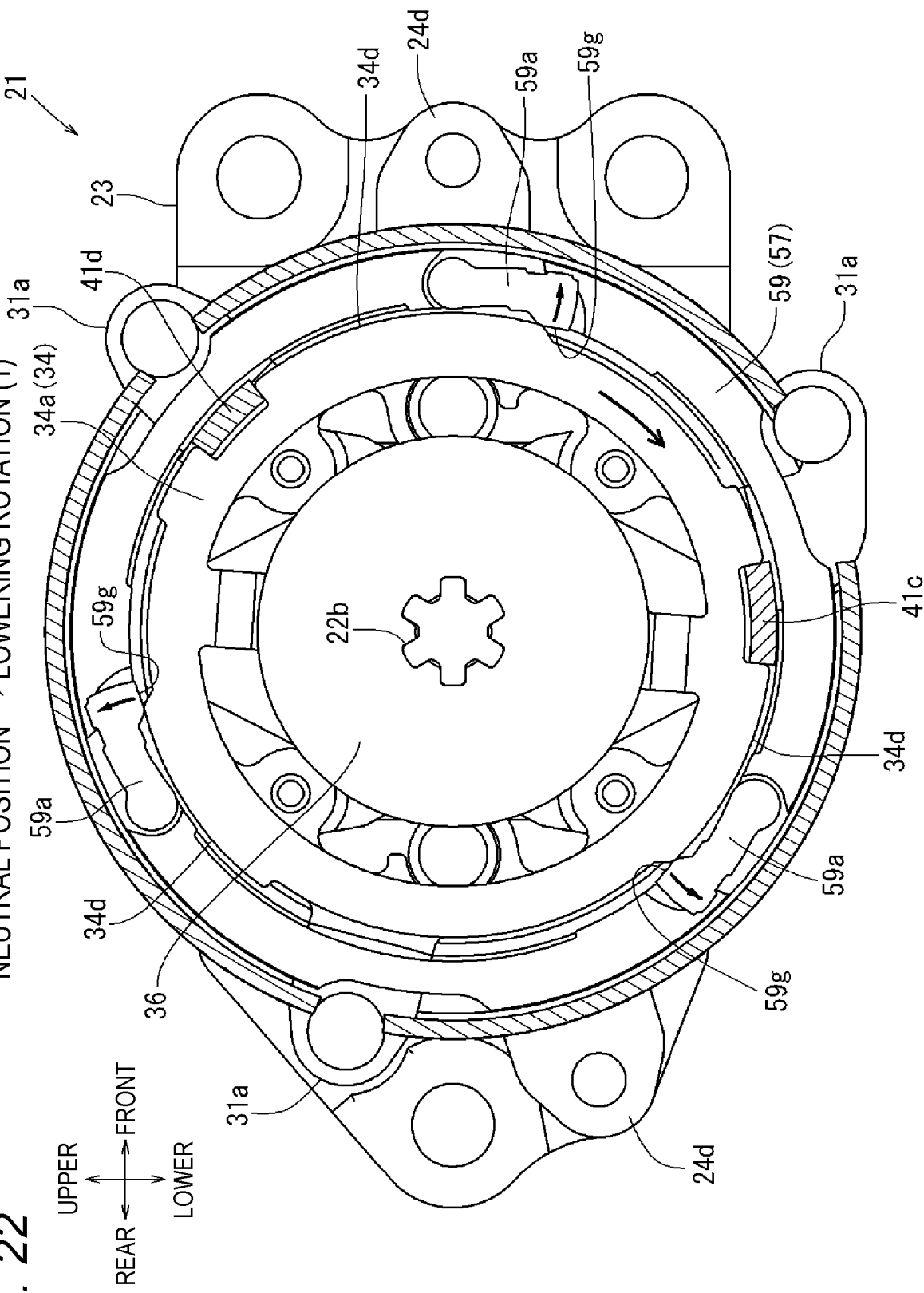
FIG. 22 illustrates an operational state of clutch portions of a friction generation unit when the operation handle is pushed down from a neutral position.

FIGS. 22 to 25 illustrate a state in which the operation handle 20 is pushed down from the neutral position. At this time, the operation plate 34 is rotated due to the rotation of the lever 41 via the engagement pieces 41c and 41d. As a result, as shown in FIG. 22, the outer peripheral ring 34a of the operation plate 34 rotates clockwise as indicated by an arrow, and when a rotation angle thereof becomes 2.5 degrees or more, for example, the first operating portions 34d of the outer peripheral ring 34a push the projecting portions 59g of the clutch portions 59a radially outward as indicated by arrows, and the pressing plate 59 is pressed toward the friction spring 58 by the abutting surfaces 59f of the clutch portions 59a (see FIG. 21). Therefore, the frictional force generated by the friction generation unit 57 is applied to the rotation of the lock plate 30.

Figure 23:
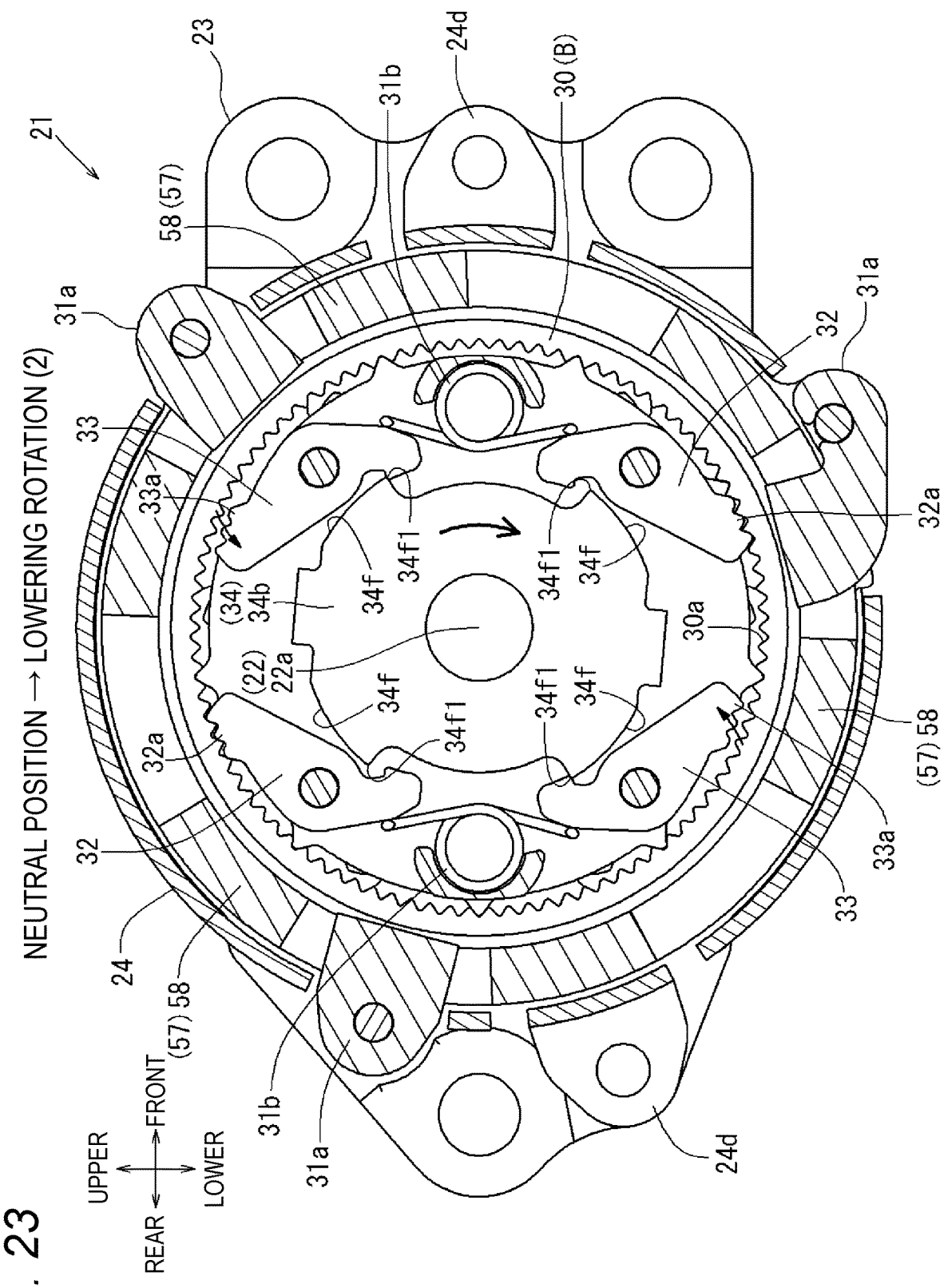
FIG. 23 illustrates an operational state of a lock mechanism when the operation handle is pushed down from the neutral position.

As shown in FIG. 23, the inner peripheral ring 34b of the operation plate 34 rotates clockwise as indicated by an arrow, and when a rotation angle thereof becomes 4 degrees or more, for example, the engagement ends 34f1 of the second operation portions 34f presses and rotates the pair of pawls 33, thereby separating the external teeth 33a thereof from the internal teeth 30a of the lock plate 30. Therefore, the lock plate 30 is released from lock (unlocked state), and becomes rotatable in the direction of lowering the seat 1.

Figure 24:
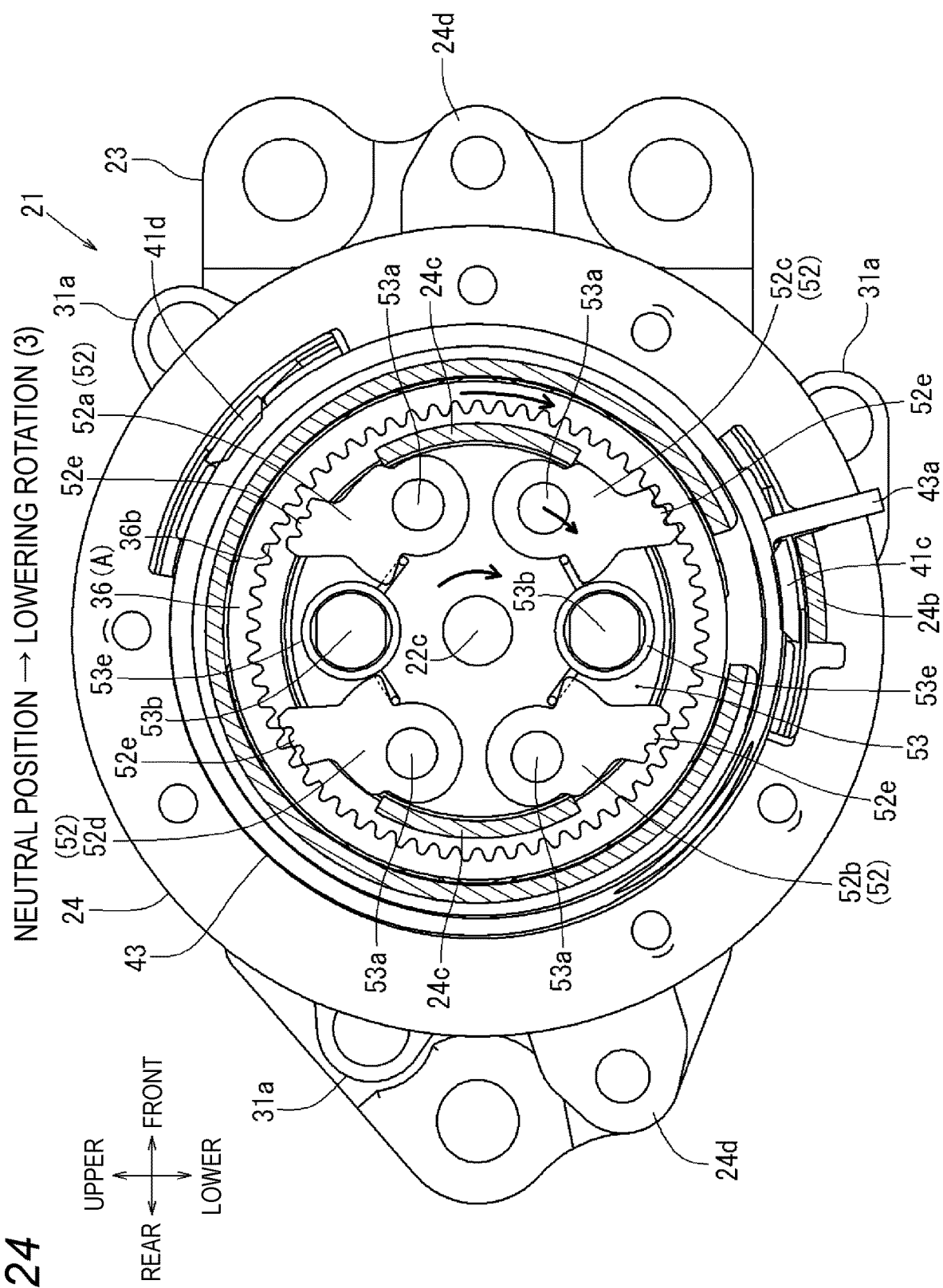
FIG. 24 illustrates an operation state of feed pawls in a rotation drive mechanism when the operation handle is pushed down from the neutral position, and shows a state in which one of lowering-side feed pawls meshes with the feed gear.
Figure 25:
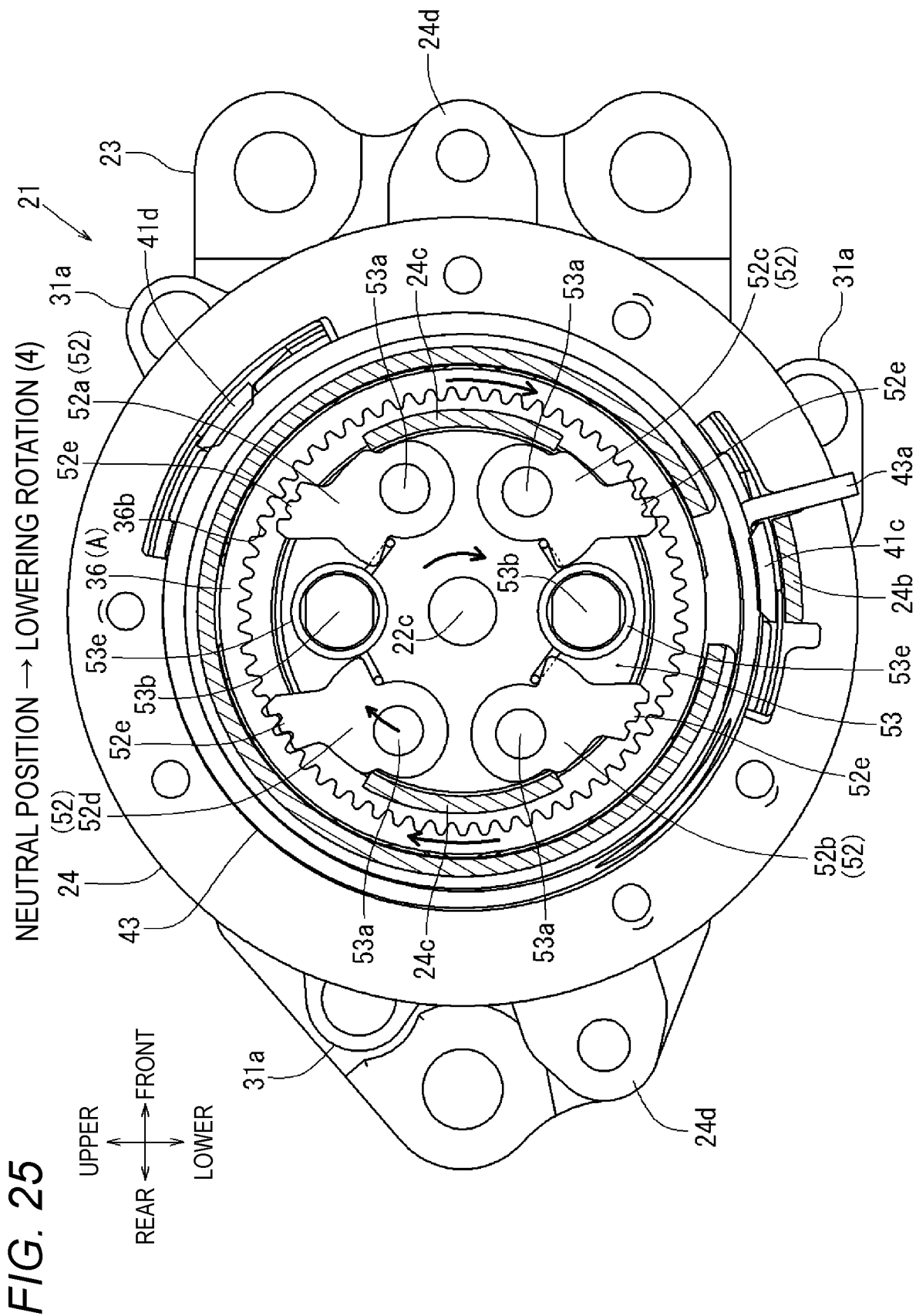
FIG. 25 is a view similar to FIG. 24, and shows a state in which the other of the lowering-side feed pawls meshes with the feed gear.

On the other hand, when the lever 41 is rotated, the rotation plate 53 is rotated via the coupling rods 53d as shown in FIGS. 24 and 25. When the rotation plate 53 is rotated, due to relative rotation between the feed pawls 52 and the erected pieces 24c, the lowering-side feed pawls 52c and 52d are spring urged to move the engagement ends 52e in the direction of meshing with the internal teeth 36b of the feed gear 36. As described above, since the lowering-side feed pawls 52c and 52d have different meshing phases with respect to the internal teeth 36b from each other, either one of the lowering-side feed pawls 52c and 52d first meshes with the internal teeth 36b. As described above, the feed gear 36 is driven to rotate by one among the lowering-side feed pawls 52c and 52d that first meshes with the internal teeth 36b. Therefore, the rotation shaft 22 is rotated in the direction of lowering the seat 1 via the spline fitting portion 36c of the feed gear 36 and the spline 22b of the rotation shaft 22 (see FIGS. 8, 11, and 16). In this state, since the lowering-side feed pawls 52c and 52d and the internal teeth 36b of the feed gear 36 do not rotate relative to each other, one among the lowering-side feed pawls 52c and 52d that does not mesh with the internal teeth 36b is maintained in the state of being not meshed. Further, the lifting-side feed pawls 52a and 52b are pressed by the respective erected pieces 24c and are placed at fixed positions that do not mesh with the internal teeth 36b. One of the lowering-side feed pawls 52c and 52d meshes with the internal teeth 36b, and the other does not mesh with the internal teeth 36b, which causes different rotation angles of the lowering-side feed pawls 52c and 52d on the rotation plate 53, but such difference is allowed due to a difference in deflection of the torsion springs 53e.

Figure 13:
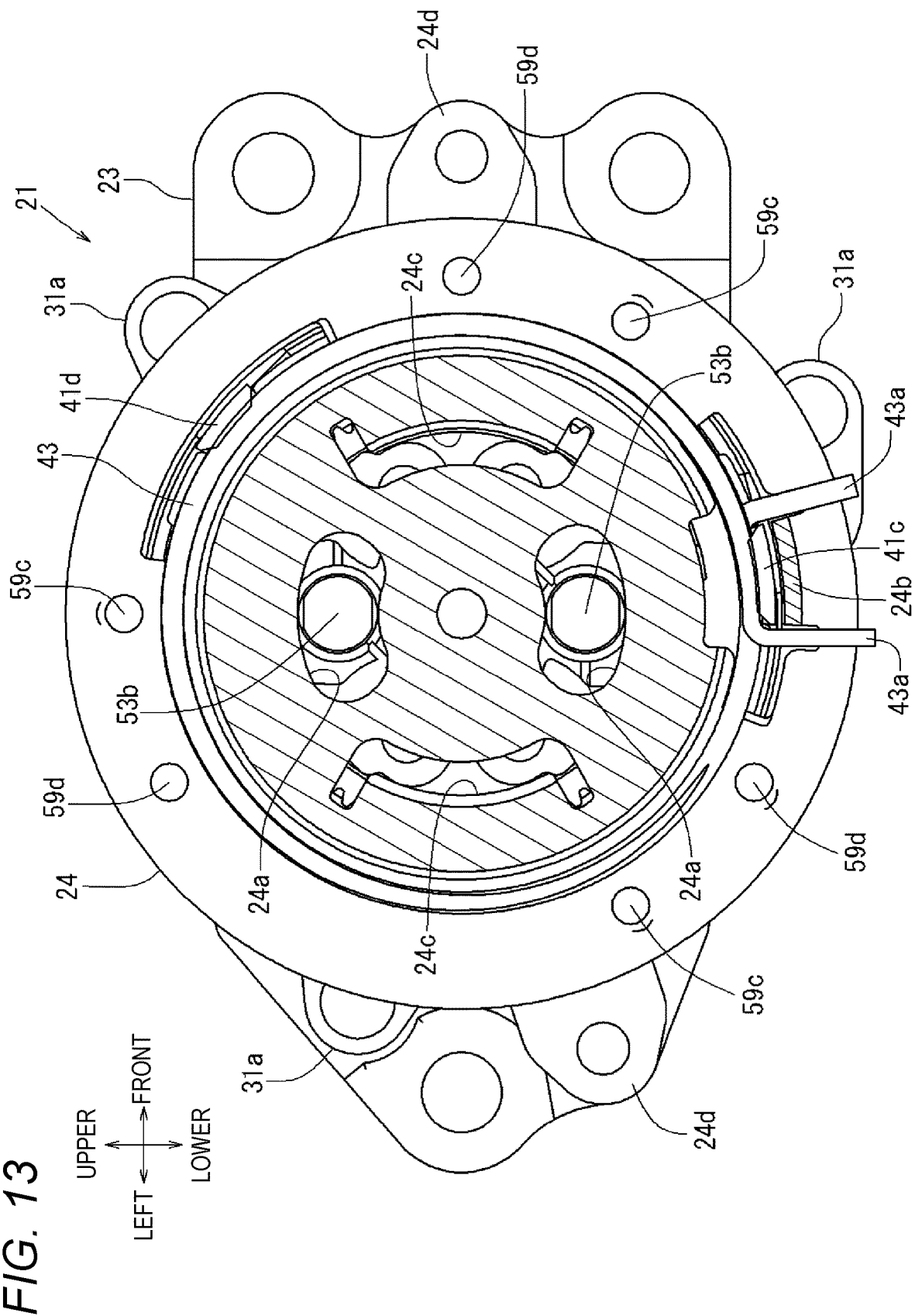
FIG. 13 is a cross-sectional view taken along line XIII-XIII in FIG. 9.

The rotation of the lever 41 is regulated by the coupling rods 53d fitted in the through holes 41a of the lever 41 being engaged with end edges of the penetrating holes 24a of the cover 24 (see FIG. 13). That is, a maximum operation angle between the operation handle 20 and the lever 41 is regulated to a predetermined angle. Such restriction is also performed by end edges of the engagement pieces 41c, 41d of the lever 41 being engaged with end edges of the engagement hole 24g and the erected hole 24m of the cover 24 (see FIG. 15). Therefore, in a case where one operation on the operation handle 20 is insufficient for a lowering amount of the seat 1, the seat 1 can be lowered to a desired position via a pumping operation of repeating the push-down operation on the operation handle 20.

If the pumping operation is always performed until the predetermined angle regulated as described above, the phases of the engagement ends 52e of the feed pawls 52 and the internal teeth 36b of the feed gear 36 does not change as long as the device is manufactured at a good accuracy, but if the pumping operation is only performed until an angle smaller than the predetermined angle, the phases of the engagement ends 52e and the internal teeth 36b will change. However, by driving the feed gear 36 to rotate by one of the lowering-side feed pawls 52c and 52d that first meshes with the internal teeth 36b, it is possible to lift the seat 1 with the minimum operation loss. Assuming that the lowering-side feed pawls 52c and 52d have matching meshing phases with respect to the internal teeth 36b, the lowering-side feed pawls 52c and 52d mesh with the internal teeth 36b simultaneously. The meshing timing is delayed by one tooth of the internal teeth 36b in the worst case. On the other hand, in the present embodiment, the meshing phases of the lowering-side feed pawls 52c and 52d are shifted from each other by half teeth of the internal teeth 36b with respect to the internal teeth 36b. Therefore, the delay of the meshing timing is half teeth of the internal teeth 36b at maximum, and it is possible to suppress an operation loss until the operation force of the operation handle 20 is transmitted to the feed gear 36 and the rotation shaft 22 is rotated.

As described above, when the operation handle 20 is operated in the direction of lowering the seat 1 and the lever 41 is rotated, the friction generation unit 57 first functions, then the lock by the lock mechanism B is released, and finally, the rotation shaft 22 is rotated by the rotation drive mechanism A to lower the seat 1. Therefore, the seat 1 is lowered while suppressing the influence of gravity of the seat 1 by the friction generation unit 57.

<Action of Rotation Control Device 21 (Push-Down Operation on Operation Handle 20 Finished)>

When the push-down operation on the operation handle 20 is finished, the rotation of the lever 41, the operation plate 34, and the rotation plate 53 is returned toward the neutral position by the urging force of the torsion spring 43. Therefore, in contrast to the rotation from the neutral position as described above, the rotation by the rotation drive mechanism A is stopped, the lock mechanism B is in the locked state, and the friction generation unit 57 does not function. At this time, the lock mechanism B is not in the locked state until the pawl 33s are in the completely meshed state with respect to the internal teeth 30a of the lock plate 30, and the lock plate 30 continues to rotate upon receiving the load of the seat 1. The rotation of the lock plate 30 is transmitted from the rotation shaft 22 via the speed increasing mechanism 25, but the rotation of the rotation shaft 22 is reduced with respect to the rotation of the lock plate 30 due to the action of the speed increasing mechanism 25. Therefore, when the push-down operation on the operation handle 20 is finished, the amount of lowering of the seat 1 therefrom is reduced as compared with a case without providing the speed increasing mechanism 25. In addition, since the load applied between tooth surfaces when the external teeth 33a of the pawl 33 mesh with the internal teeth 30a of the lock plate 30 is smaller than that in the case without providing the speed increasing mechanism 25, the shock and noise associated with the meshing can be reduced.

<Operation of Rotation Control Device 21 (Pull-Up Operation on Operation Handle 20)>

When the operation handle 20 is pulled up from the neutral position, the lever 41 is rotated in a direction opposite to the above-described push-down operation. As a result, the operation plate 34 is rotated by the engagement pieces 41c and 41d in a direction opposite to the arrow in FIG. 22. Therefore, unlike the case of FIG. 22 described above, the projecting portions 59g of the clutch portions 59a of the pressing plate 59 are not pushed radially outward by the first operating portions 34d of the outer peripheral ring 34a of the operation plate 34. As a result, the pressing plate 59 is not pressed toward the friction spring 58. Therefore, the frictional force generated by the friction generation unit 57 is not applied to the lock plate 30.

Figure 26:
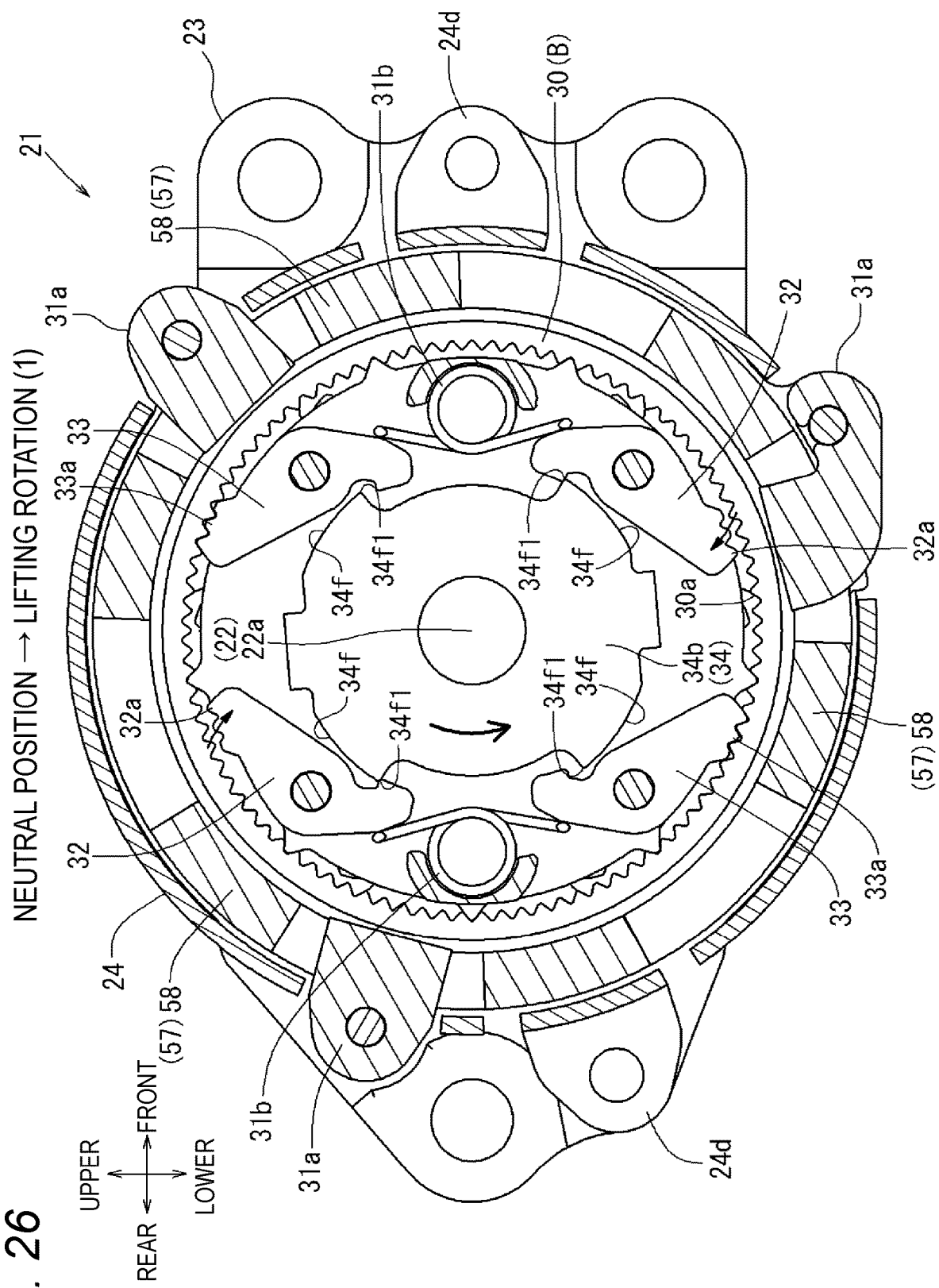
FIG. 26 illustrates an operational state of a lock mechanism when the operation handle is pulled up from the neutral position.

The rotation angle of the lever 41, the operation plate 34, and the rotation plate 53 is increased, and when the rotation angle becomes 2 degrees or more, for example, as shown in FIG. 26, the engagement ends 34f1 of the second operation portions 34f rotates the pair of pawls 32 due to the rotation of the inner peripheral ring 34b of the operation plate 34, thereby separating the external teeth 32a thereof from the internal teeth 30a of the lock plate 30. Therefore, the lock plate 30 is released from lock, and becomes rotatable in the direction of lifting the seat 1.

Figure 27:
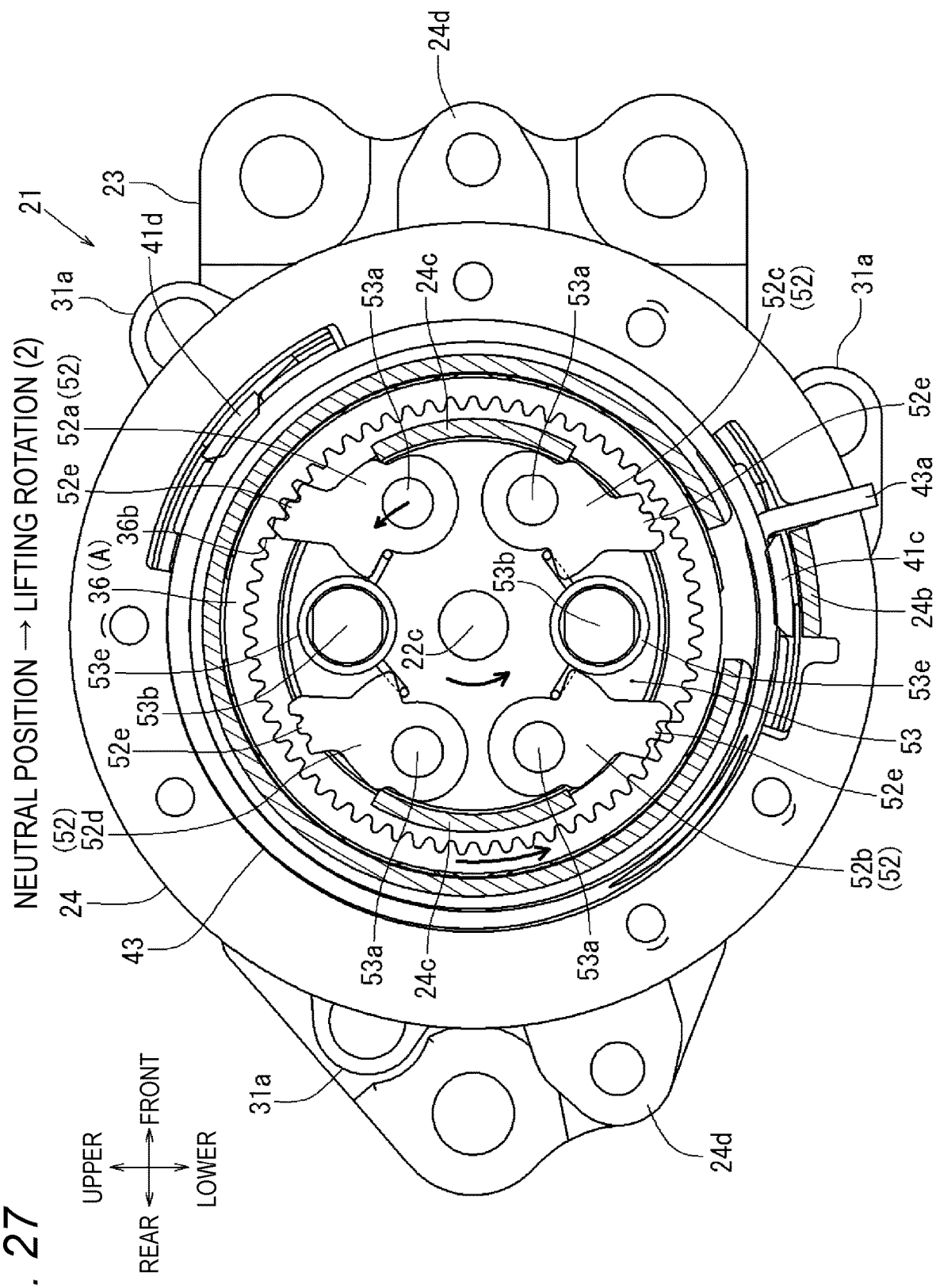
FIG. 27 illustrates an operation state of feed pawls in a rotation drive mechanism when the operation handle is pulled up from the neutral position, and shows a state in which one of lifting-side feed pawl meshes with the feed gear.
Figure 28:
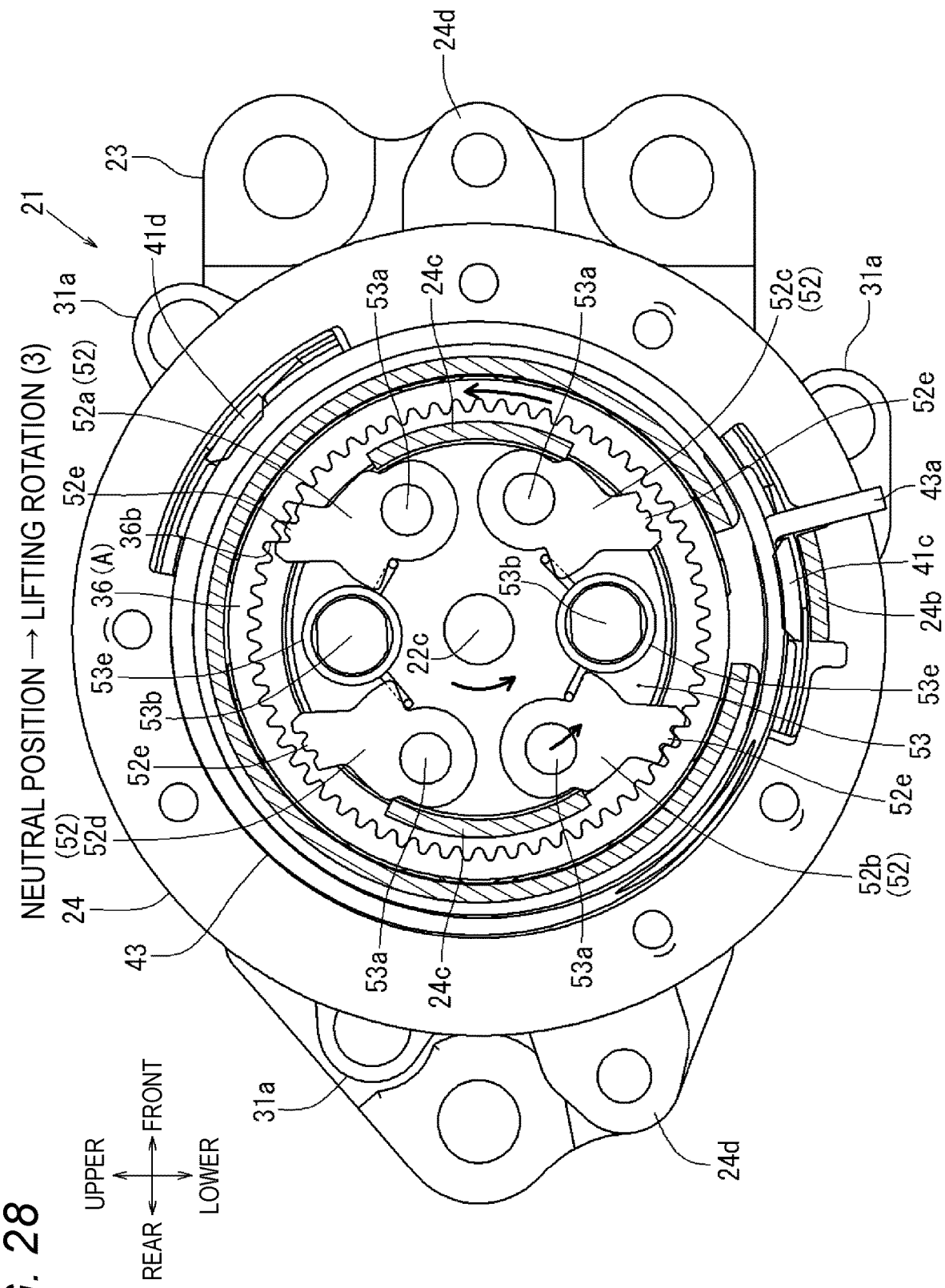
FIG. 28 is a view similar to FIG. 27, and shows a state in which the other of the lifting-side feed pawls meshes with the feed gear.

When the lever 41 is further rotated, as shown in FIGS. 27 and 28, either one of the lifting-side feed pawls 52a and 52b meshes with the internal teeth 36b of the feed gear 36. The relation of which of the lifting-side feed pawls 52a and 52b meshes with the internal teeth 36b and the like is the same as that in the case of lowering the seat 1 described above, and the feed gear 36 is driven to rotate by one of the lifting-side feed pawls 52a and 52b that first meshes with the internal teeth 36b.

When the lever 41 is rotated to a certain angle, similarly as the case of lowering the seat 1 described above, the coupling rods 53d are engaged with the end edges of the penetrating holes 24a, and the engagement pieces 41c and 41d are engaged with the end edges of the engagement hole 24g and the erected hole 24m, so as to perform regulation to prevent further operation. Therefore, in a case where one operation on the operation handle 20 is insufficient for a lifting amount of the seat 1, the seat 1 can be lifted to a desired position via a pumping operation of repeating the pull-up operation on the operation handle 20. The meshing phases between the engagement ends 52e of the lifting-side feed pawls 52a and 52b and the internal teeth 36b of the feed gear 36 change when a pumping operation amount changes per operation and the rotation amount of the feed gear 36 changes. However, by driving the feed gear 36 to rotate by one of the lifting-side feed pawls 52a and 52b that first meshes with the internal teeth 36b, it is possible to lift the seat 1 with the minimum operation loss.

As described above, when the operation handle 20 is operated in the direction of lifting the seat 1 and the lever 41 is rotated, the friction generation unit 57 does not function, the lock by the lock mechanism B is released, and then the rotation shaft 22 is rotated by the rotation drive mechanism A to lift the seat 1. Therefore, the seat 1 is lifted without being affected by friction by the friction generation unit 57.

<Action of Rotation Control Device 21 (Pull-Up Operation on Operation Handle 20 Finished)>

When the pull-up operation on the operation handle 20 is finished, the rotation of the lever 41 is returned toward the neutral position by the urging force of the torsion spring 43. Therefore, in contrast to the rotation from the neutral position as described above, the rotation by the rotation drive mechanism A is stopped, and the lock mechanism B is in the locked state. At this time, the lock mechanism B is not in the locked state until the pawl 33s are in the completely meshed state with respect to the internal teeth 30a of the lock plate 30, and the lock plate 30 continues to rotate upon receiving the load of the seat 1. The rotation of the lock plate 30 is transmitted from the rotation shaft 22 via the speed increasing mechanism 25, but the rotation of the rotation shaft 22 is reduced with respect to the rotation of the lock plate 30 due to the action of the speed increasing mechanism 25. Therefore, when the pull-up operation on the operation handle 20 is finished, the amount of lowering of the seat 1 therefrom is reduced as compared with a case without providing the speed increasing mechanism 25. In addition, since the load applied between tooth surfaces when the external teeth 33a of the pawl 33 mesh with the internal teeth 30a of the lock plate 30 is smaller than that in the case without providing the speed increasing mechanism 25, the shock and noise associated with the meshing can be reduced.

<Operation of Rotation Control Device 21 (Summary)>

As described above, when the operation handle 20 is pushed down, the seat 1 is lowered by a movement amount corresponding to this operation. By repeating the push-down operation, the seat 1 can be adjusted to a desired height. Conversely, when the operation handle 20 is pulled up, the seat 1 is similarly lifted by a movement amount corresponding to this operation. By repeating the pull-up operation, the seat 1 can be adjusted to a desired height.

<Action and Effect of One Embodiment>

According to the above embodiment, when the operation handle 20 is operated, the first operating portions 34d of the operation plate 34 is operated by the engagement pieces 41c and 41d of the lever 41, and the friction generation unit 57 functions. Then, the second operating portion 34f is operated, and the locked state of the lock mechanism B is released. Finally, the feed pawls 52, which have been separated so far, mesh with the feed gear 36 to drive the rotation shaft 22 to rotate. Therefore, by operating the operation handle 20, a series of operations can be performed such that in a state where the friction generation unit 57 functions, the lock mechanism B is released from lock, and the rotation shaft 22 is rotated to lift or lower the seat. In addition, the delay is realized by only separating the feed pawls 52 and the feed gear 36 from each other instead of meshing at the start of the operation on the lever 41, without providing a special member to delay the rotational drive of the feed gear 36 via the operation of the friction generation unit 57 and the lock mechanism B. Therefore, the configuration of the device can be simplified.

Further, by separating the feed pawls 52 and the feed gear 36 from each other instead of meshing, an operation loss of one tooth of the internal teeth 36b of the feed gear 36 at maximum may occur until the meshing phases thereof match each other when meshing. On the other hand, according to the above embodiment, since the phases of each pair of the feed pawls 52 are shifted by half teeth of the internal teeth 36b, the operation loss can be suppressed to half teeth at maximum.

Further, one pair of feed pawls 52 are provided in each feed direction, and the number of teeth of the internal teeth 36*b* of the feed gear 36 is set to an odd number. Thus, the phases of the feed pawls 52 in the same feed direction can be shifted from each other in a state in which the feed pawls 52 are arranged to face each other on a virtual straight line passing through the rotation center of the rotation plate 53. As a result, the feed pawls 52 can be used in common.

The rotation shaft 22 is driven by the rotation drive mechanism A to rotate independently from the speed increasing mechanism 25. Therefore, the operation on the operation handle 20 that operates the rotation drive mechanism A does not change as compared with the case without providing the speed increasing mechanism 25, and the operation on the operation handle 20 does not become heavy and the operation amount does not increase even though the speed increasing mechanism 25 is provided.

The rotation driving mechanism A directly transmits the rotation of the rotation driving mechanism A to the rotation shaft 22 by using the through hole 29*c* of the sun gear 29 of the speed increasing mechanism 25. Therefore, load transmission paths of the rotation driving mechanism A and the speed increasing mechanism 25 can be in parallel with each other.

Further, the friction generation unit 57 is provided to the lock plate 30 whose speed is increased by the speed increasing mechanism 25. Therefore, it is possible to reduce the frictional force of the friction generation unit 57 for suppressing the rotation of the rotation shaft 22. Therefore, the configuration of the friction generation unit 57 can be simplified.

Further, the speed increasing mechanism 25 increases the speed of the lock plate 30 which has a simple shape, and the pawls 32 and 33 which are rotated are on a fixed side. Therefore, it is possible to prevent a centrifugal force in correspondence to the speed increase from acting as an excessive external force on the pawls 32 and 33.

Further, the leg portions 31*a* of the pawl holder 31 are arranged using a space formed by the waveform surface of the friction spring 58. Therefore, the space efficiency is good, and the size of the rotation control device 21 can be reduced.

<Other Embodiments>

Although a specific embodiment has been described above, the present disclosure is not limited to those appearances and configurations, and modifications, additions and deletions can be made thereto. For example, the present disclosure is applied to a seat of an automobile in the above embodiment, and may also be applied to a seat mounted on an airplane, a ship, a train, or the like, or a seat installed in a movie theater or the like.

The above embodiment describes an example including the friction generation unit 57 that applies frictional force to the rotation in the direction of lowering the seat 1, but the friction generation unit 57 may be configured to apply a frictional force to not only the rotation in the direction of lowering the seat 1 but also in the direction of lifting the seat 1. The present disclosure can also be applied to a device that does not include a friction generation unit.

In the above embodiment, the lifting-side and lowering-side feed pawls 52 are respectively provided in combination of pairs, but may also be provided in combination of three or more. Further, in the above embodiment, the feed gear 36 is formed into a container shape with the internal teeth as the gear and the feed pawls 52 are disposed inside the feed gear 36, but the gear of the feed gear 36 may be external teeth, and the feed pawls 52 may be disposed on the outer peripheral side of the feed gear 36. In this case, a layout having an increased number of feed pawls is possible, and as the number of feed pawls increases, the meshing phase difference with respect to the feed gear between the feed pawls can be reduced, which reduces the operation loss.

In the above embodiment, the rotation of the feed gear 36 of the rotation drive mechanism A is transmitted to the rotation shaft 22 by using the through hole 29*c* of the sun gear 29 of the speed increasing mechanism 25, so that the rotation transmission paths of the rotation drive mechanism A and the speed increasing mechanism 25 are in parallel with each other, but a through hole may be provided in the feed gear 36, and the rotation of the rotation shaft may be transmitted to the speed increasing mechanism 25 by using the through hole.

In the above embodiment, the leg portions 31*a* of the pawl holder 31 are fixed to the support member 23 through the gaps between the friction spring 58 and the pressing plate 59, but also may be fixed to the support member 23 through gaps formed between the friction spring 58 and the lock plate 30.

What is claimed is:

1. A lifter device comprising:
   a pinion gear that is configured to mesh with an input gear of a link mechanism that lifts or lowers a seat; and a rotation control device that is configured to control rotation of the pinion gear and includes:
      a rotation shaft that is configured to rotate in synchronization with the pinion gear,
      a support housing that rotatably supports the rotation shaft,
      a rotation driving mechanism that is configured to, when an operation handle for lifting or lowering the seat is operated to lift or lower the seat, rotate the rotation shaft toward a lifting side or a lowering side in accordance with an operation direction of the operation handle, and
      a lock mechanism having a lock plate, wherein the lock mechanism is configured to, when the operation handle is operated to lift or lower the seat, allow rotation of the rotation shaft, and to lock the rotation of the rotation shaft in a neutral position in which the operation handle is released from operation, wherein the rotation driving mechanism includes:
      a feed gear that is coupled with and configured to rotate together with the rotation shaft, wherein the circumference of the feed gear is provided with a gear, and
      a plurality of feed pawls that is configured to mesh with the feed gear so as to drive the feed gear to rotate in the operation direction of the operation handle when the operation handle is operated, and to be released from meshing with the feed gear so as to be returned to a predetermined position when the operation handle is released from operation and is returned to the neutral position,
   wherein the lock mechanism is configured to release locking of the rotation shaft until any one of the feed pawls meshes with the feed gear when the operation handle is operated, and
   wherein a plurality of the feed pawls are provided with respect to either operation direction on the seat lifting side or lowering side of the operation handle, and one of the feed pawls meshes with the feed gear when at least one of the others of the feed pawls does not mesh with the gear.

2. The lifter device according to claim 1,
wherein the feed pawls include:
- a plurality of lifting-side feed pawls configured to rotate the rotation shaft toward the lifting side in which one of the lifting-side feed pawls meshes with the gear when at least one of the others of the lifting-side feed pawls does not mesh with the gear, and
- a plurality of lowering-side feed pawls configured to rotate the rotation shaft toward the lower side in which one of the lowering-side feed pawls meshes with the gear when at least one of the others of the lowering-side feed pawls does not mesh meshes with the gear.

3. The lifter device according to claim 2, further comprising:
a friction generation unit having a friction spring, wherein the friction generating unit is configured to apply a frictional force to the rotation of the rotation shaft when the operation handle is operated to lower the seat.

4. The lifter device according to claim 2,
wherein the number of the feed pawls with respect to said either operation direction of the operation handle is an even number, and wherein the number of teeth of the gear on the entire circumference of the feed gear is an odd number.

5. The lifter device according to claim 1,
wherein the number of the feed pawls with respect to said either operation direction of the operation handle is an even number, and wherein the number of teeth of the gear on the entire circumference of the feed gear is an odd number.

6. The lifter device according to claim 5,
wherein the feed pawls include:
- a pair of lifting-side feed pawls configured to rotate the rotation shaft toward the lifting side in which one of the pair of the lifting-side feed pawls meshes with the gear when the other of the pair of the lifting-side feed pawls does not mesh with the gear, and
- a pair of lowering-side feed pawls configured to rotate the rotation shaft toward the lower side in which one of the pair of the lowering-side feed pawls meshes with the gear when the other of the pair of the lowering-side feed pawls does not mesh with the gear, wherein each of the lifting-side feed pawls and the lowering-side feed pawls is rotatably supported by a hinge pin on a rotation plate that is rotated upon operation on the operation handle, and is spring urged so as to rotate in a direction in which the feed pawl meshes with the feed gear,
wherein the hinge pins of the lifting-side feed pawls and the hinge pins of the lowering-side feed pawls are respectively supported so as to face each other across a rotation axis of the rotation plate,
wherein the gear of the feed gear is constituted by internal teeth, and the rotation plate is on an inner side of the internal teeth of the feed gear and is configured such that the lifting-side feed pawls and the lowering-side feed pawls mesh with the internal teeth, and
wherein the support housing is provided with a plurality of release pieces configured to abut against the lifting-side feed pawls and the lowering-side feed pawls so as to rotate the feed pawls to positions at which the feed pawls do not mesh with the feed gear when the operation handle is released from the operation and is in the neutral position, and to allow the feed pawls to mesh with the feed gear when the operation handle is operated to lift or lower the seat.

7. The lifter device according to 6, further comprising:
a friction generation unit having a friction spring, wherein the friction generating unit is configured to apply a frictional force to the rotation of the rotation shaft when the operation handle is operated to lower the seat.

8. The lifter device according to claim 6,
wherein the lock mechanism includes:
- the lock plate coupled in a rotational direction to the rotation shaft,
- an operation plate configured to be rotated by the operation handle, and
- a pawl configured to be operated by the operation plate to lock or unlock rotation of the lock plate, and
wherein the operation plate is coupled so as to be rotated simultaneously with the rotation plate by the operation handle.

9. The lifter device according to 8, further comprising:
a friction generation unit having a friction spring, wherein the friction generating unit is configured to apply a frictional force to the rotation of the rotation shaft when the operation handle is operated to lower the seat.

* * * * *